(12) United States Patent
Chan

(10) Patent No.: US 6,427,050 B1
(45) Date of Patent: Jul. 30, 2002

(54) PHOTOGRAPHIC FILM CONTAINER AND LOADING METHOD

(76) Inventor: Yet Chan, 12/F., Union Hing Yip Factory Building, 20 Hing Yip Street, Kwun Tong, Kowloon (HK)

( * ) Notice: Subject to any disclaimer, the term of this patent is extended or adjusted under 35 U.S.C. 154(b) by 0 days.

(21) Appl. No.: 09/494,904

(22) Filed: Jan. 31, 2000

(51) Int. Cl.[7] .............................. G03B 1/00; G03B 17/26
(52) U.S. Cl. ........................... 396/6; 396/388; 396/513
(58) Field of Search ........................... 396/6, 388, 411, 396/511, 512, 513, 514, 516; 242/335, 337.1, 348, 348.1, 348.2, 348.3, 348.4, 341, 346

(56) References Cited

U.S. PATENT DOCUMENTS

| | | | | |
|---|---|---|---|---|
| 3,460,449 A | * | 8/1969 | Eagle | 396/284 |
| 4,860,966 A | * | 8/1989 | Cloutier | 242/348.3 |
| 5,450,150 A | * | 9/1995 | Smart et al. | 396/440 |
| 5,619,298 A | * | 4/1997 | Stiehler | 396/388 |
| 5,721,610 A | * | 2/1998 | Kiten et al. | 355/75 |
| 5,860,613 A | * | 1/1999 | Holland | 242/348.4 |
| 5,895,126 A | * | 4/1999 | Watkins et al. | 396/6 |
| 5,971,312 A | * | 10/1999 | Takatori et al. | 242/348.4 |
| 6,233,401 B1 | * | 5/2001 | Leung | 396/6 |

* cited by examiner

Primary Examiner—David M. Gray
(74) Attorney, Agent, or Firm—Samuels, Gauthier & Stevens

(57) ABSTRACT

A photograph film container (2, 102, 202) has a housing (4, 104, 204) defining an elongate film slot through which, in use, the film may extend, and an aperture (13, 15; 113, 115; 213, 215) for insertion of a film-winding tool (42), the aperture (13, 15; 113, 115; 213, 215) being closed by a resiliently biased movable shutter plate (28). A method of loading film into such a container involves the steps of inserting a film winding tool (42) through an end cover of the container with the shutter (28) open and securing a leading end of the film extending from a further film container onto the end of a film-winding tool (42); inserting the housing over the film-winding tool and securing the end cover to the housing; enclosing the first and second film containers in a light-tight enclosure; rotating the film winding tool to wind the majority of the film out of the second film container and into the further film container; (f) removing the end of the film winding tool from the first film container and closing the movable shutter plate to close the aperture; and (g) opening the enclosure and removing the film assembly.

43 Claims, 30 Drawing Sheets

PHOTOGRAPHIC FILM CONTAINER AND LOADING METHOD

BACKGROUND OF THE INVENTION

The present invention relates to a photographic film container having particular, but not exclusive, applicability to simple cameras, to a film assembly including such a container and to a loading method therefor.

In recent years cameras known variously as disposable or single-use cameras, or referred to by some as lens-fitted photographic film packages, have become increasingly popular. These are cameras of simple construction and low cost which are usually pre-loaded with film by the manufacturer. It is usually arranged that the film is unwound from the standard film cassette or patrone, and as pictures are sequentially taken the film is wound back into the cassette. Once the user finishes the film, the user returns the entire camera to the photolab for developing of the film. The manufacturer may then either discard the camera in its entirety, or subject to appropriate checks that the camera is still functional, re-load the camera. Alternatively the manufacturer may re-use specific components of the camera.

One consideration with such a camera is the ease of loading of the film, particularly given the requirement that the film must be pre-wound out of the film cassette before use. In view of the low cost of the camera itself manufacture and assembly costs are important, and this includes the cost of loading the film into the camera at the factory. It is highly desirable to utilize a method which is simple and cheap and yet reliable.

As the awareness of problems of environmental contamination increases, as well as for economic reasons, consumers are less willing to tolerate disposable products. It has previously been proposed by the applicant to provide a very simple and cheap camera of generally similar construction to a disposable camera and yet which includes adaptations allowing it to be re-used at least several times by a user.

The present invention seeks to provide a film container which can be used in combination with a conventional film patrone to facilitate a film pre-winding operation, to a film assembly comprising such a container and patrone, to a method of loading such an assembly and to a camera loaded with such an assembly.

SUMMARY OF THE INVENTION

In a first aspect the invention provides a photographic film-receiving container having a housing defining an elongate film slot through which, in use, the film may extend, and defining an aperture for insertion of a film-winding tool, with a movable shutter plate movably mounted on the container so as to be movable between an open position in which said aperture is unobscured and a closed position in which the aperture is closed.

The provision of the shuttered aperture in the container allows insertion and retraction of a film winding tool used to pre-wind film into the container, facilitating daylight winding utilizing a winding apparatus as discussed below.

In one embodiment the housing is open at one end which is closed by an end cover defining said aperture, the shutter plate being mounted on the end cover, and the shutter plate being pivotably mounted on the end cover and is provided with resilient means such as a leg spring to urge the plate into a closed position in which the aperture is obscured.

The end cover may comprise an assembly of first and second parallel plates having coincident apertures, together defining a cavity therebetween in which the shutter plate is arranged. One of the first and second plates has an upstanding peripheral flange which defines a step within which the other of the first or second plates sits. The end cover is connected to the housing through the first plate which is overlain by the second plate. The second plate may be provided with a collar portion surrounding its aperture.

In an alternative embodiment the housing is open at one end which is closed by an end cover which comprises an end cap closing said opening which is overlain by an end plate secured to the end cap on which said shutter plate is mounted, both said cap and end plate having co-axial apertures therethrough for insertion of the film winding tool. The end plate may comprise an assembly of first and second plates as described above.

In a further alternative embodiment the housing comprises a pair of housing shell halves which can be fitted together defining a film tool insertion aperture at one end, and defining the film slot between opposed surfaces on the two shell halves. In this embodiment the opposed surfaces are each provided with a layer of soft fabric or fabric-like material, such as velvet. The end of the housing is overlain by an end plate which is secured thereto and on which the shutter plate is mounted. In this case the end plate may also comprises an assembly of first and second plates as described above.

The invention also resides in a film package or assembly which is a combination of a conventional film patrone and a film container as described above housing a length of photographic film wound in a coil within the film container and extending through the film slot to the film patrone, and in a camera having such a film package or assembly therein.

The assembly allows a user to re-load a single-use type camera by simply fitting the assembly into the camera.

In a further aspect the invention may also reside in a photographic film-receiving container, having a housing comprising a pair of shell halves which together define a film slot through which, in use, film may extend, and defining an aperture for insertion of a film-winding tool, with a shutter plate movably mounted on the container so as to be movable between an open position in which said aperture is unobscured and a closed position in which the aperture is closed.

In a further aspect of the invention there is provided a method of loading film into a film assembly comprising a first film container, and a second film container having a housing defining a film slot therein and an end cover which defines at one end a film-winding tool aperture which is closed by a movable shutter plate, the method comprising the steps of: (a) providing a first film container having a length of film wound therein; (b) inserting a film winding tool through the end cover of the container film container with the shutter open and securing a leading end of the film extending from the first film container onto the end of a film-winding tool; (c) inserting one of the housing or film-winding tool having the film secured thereto into or over the other of the film-winding tool or housing and securing the end cover to the housing; (d) enclosing the first and second film containers in a light-tight enclosure; (e) rotating the film winding tool to wind the majority of the film out of the first film container and into the second film container; (f) removing the end of the film winding tool from the second film container and closing the movable shutter plate to close the aperture; and (g) opening the enclosure and removing the film assembly.

The method allows film winding to be achieved in daylight using a very simple and compact light-tight enclosure, the shutter ensuring the film container is rendered light tight as the film winding tool is removed.

The method may use a second container where the end cover has a collar portion surrounding the aperture, and utilize a film winding tool having a support through which the tool extends, wherein during step (e) the collar abuts the support making a light-tight connection therewith. During step (f) the second film container is maintained abutting the support, thereby maintaining a light-tight connection therewith as the end of the film winding tool is withdrawn from the second film container.

In a further aspect the invention resides in a method of loading film into a camera having a pair of film chambers arranged on opposite sides of an exposure opening, and a camera back which closes the film chambers comprising the steps of: (a) providing a first film container having a length of film wound therein; (b) providing a second film container having a housing defining a film slot therein and an end cover which defines at one end a film winding tool aperture which is closed by a movable shutter plate; (c) inserting a film winding tool through the end cover of the second film container with the shutter open and securing a leading end of the film extending from the first film container onto the end of a film-winding tool; (d) inserting one of the housing or film-winding tool having the film secured thereto into or over the other of the film-winding tool or housing and securing the end cover to the housing; (e) enclosing the first and second film containers in a light-tight enclosure; (f) rotating the film winding tool to wind the majority of the film out of the first film container and into the second film container; (g) removing the end of the film winding tool from the second film container and closing the movable shutter plate to close the aperture; (h) opening the enclosure and removing the film assembly; and (i) placing the film assembly in the camera with the containers in respective chambers and closing the camera back.

The film container and film assembly may use either conventional colour or black and white film, but may additionally use film having pre-exposed latent images thereon. In this case the loading method involves at step (i) the additional step of ensuring that an alignment mark on the film is arranged in alignment with an alignment mark on the camera so as to ensure correct alignment of user-exposed images and pre-exposed images.

As an alternative to forming the film assembly by unwinding film housed in a conventional film patrone, the film may be unwound from a bulk roll. According to a further aspect of the present invention there is provided a method of loading film into a film assembly comprising a first film container, and a second film container having a housing defining a film slot therein and an end cover which defines at one end a film-winding tool aperture which is closed by a movable shutter plate, the method comprising the steps of: (a) providing a length of film wound in a roll and having a leading end; (b) inserting a film winding tool through the end cover of the second film container with the shutter open and securing a leading end of the film extending from the roll onto the end of a film-winding tool; (c) inserting one of the housing or film-winding tool having the film secured thereto into or over the other of the film-winding tool or housing and securing the end cover to the housing; (d) enclosing the second film container in a light-tight enclosure in communication with the roll of film; (e) rotating the film winding tool to wind the film from the roll and into the second film container on the film-winding tool; (f) cutting the film extending from the second film container to sever it from the roll; (g) removing the end of the film winding tool from the second film container and closing the movable shutter plate to close the aperture; (h) opening the enclosure and removing the second film container with the film wound therein; and (i) securing the free end extending from the second film container to a first film container.

The first film container may be a conventional film patrone having a central spool, the free end of the film which has been cut from the roll being secured to a spool of the first film container.

BRIEF DESCRIPTION OF THE DRAWINGS

Embodiments of the invention are now described, by way of example only, with reference to the following drawings in which.

DESCRIPTION OF THE PREFERRED EMBODIMENTS

Figure 1:
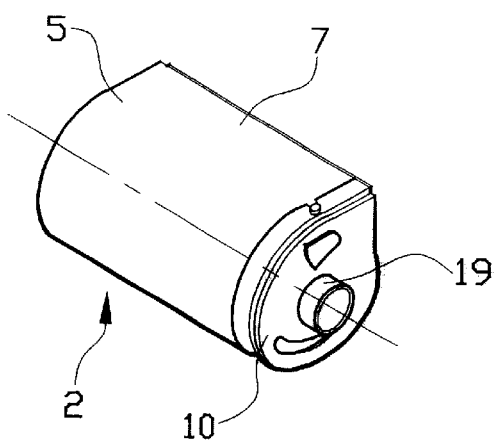
FIG. 1 shows a film container in accordance with a first embodiment of the invention.
Figure 2:
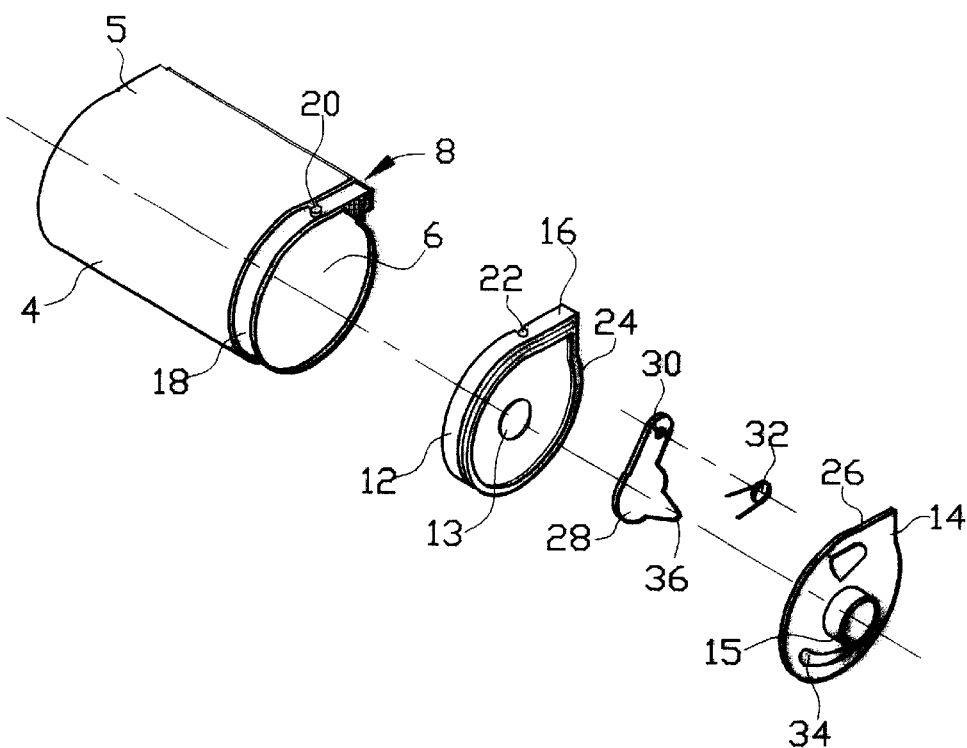
FIG. 2 is an exploded view of the film container of FIG. 1.

Turning to the drawings, and firstly to FIGS. 1 and 2, there are shown views of the film container in accordance with a first embodiment of the invention, the container being indicated generally by numeral 2. The container 2 comprises age nerally cylindrical or cup-like housing 4 closed at one end 5 and open at the opposite end 6. The housing 4 does not contain any spool therein. At a region of the side wall o f the ho using there is a flattened portion 7 which defines adjacent thereto an elongate film additionally adhesive or welding may be used.

Within the cavity there is arranged a movable shutter plate or blade 28 which is pivotably supported at 30. Leg spring 32 one leg of which abuts the rim 24 and the other of which abuts the shutter plate 28 urges the plate 28 into a "closed" position whereby it blocks the apertures 13 and 15. The outer plate 14 is provided with an arcuate slot 34. A protrusion 36 on an arm of the shutter plate 28 extends into the slot 34 allowing the user to manually open the shutter if desired. The outer plate 14 is also provided with an upstanding collar portion 19 which surrounds the aperture 15.

Figure 7:
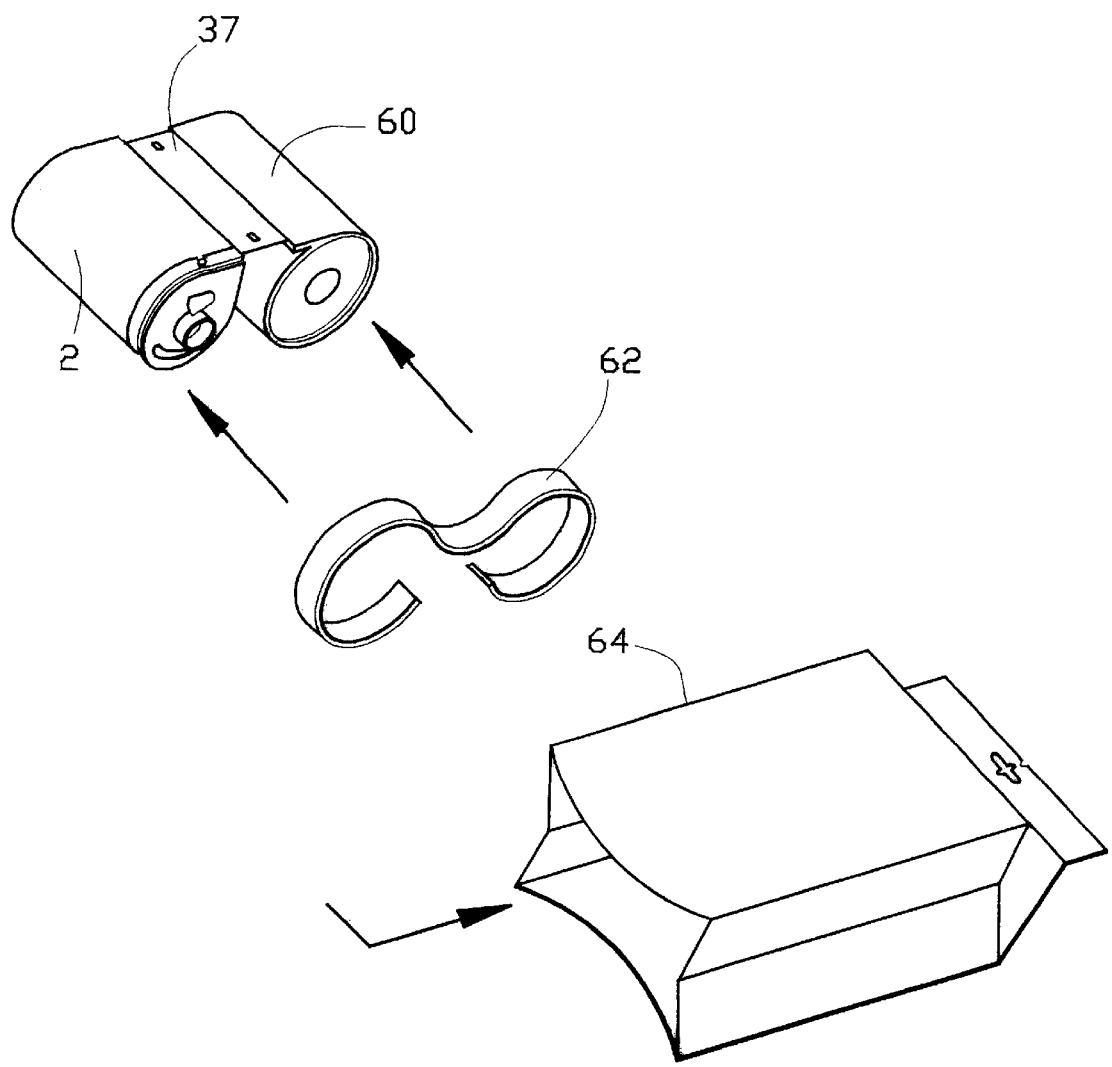
FIG. 7 shows the pre-wound film assembly being secured and sealed in an outer protective package.

In use the container 2 is used in combination with an additional film container as shown in FIG. 7. The additional film container is preferably a conventional 35 mm film cassette or patrone 60 having a central spool on which the film 37 is wound. For use in a camera of a type which is generally similar in construction to a single-use type camera the film must be pre-wound out of the film patrone 60 and into the container 2 so that as pictures are taken the film is progressively wound back into the film patrone 60.

Figure 3:
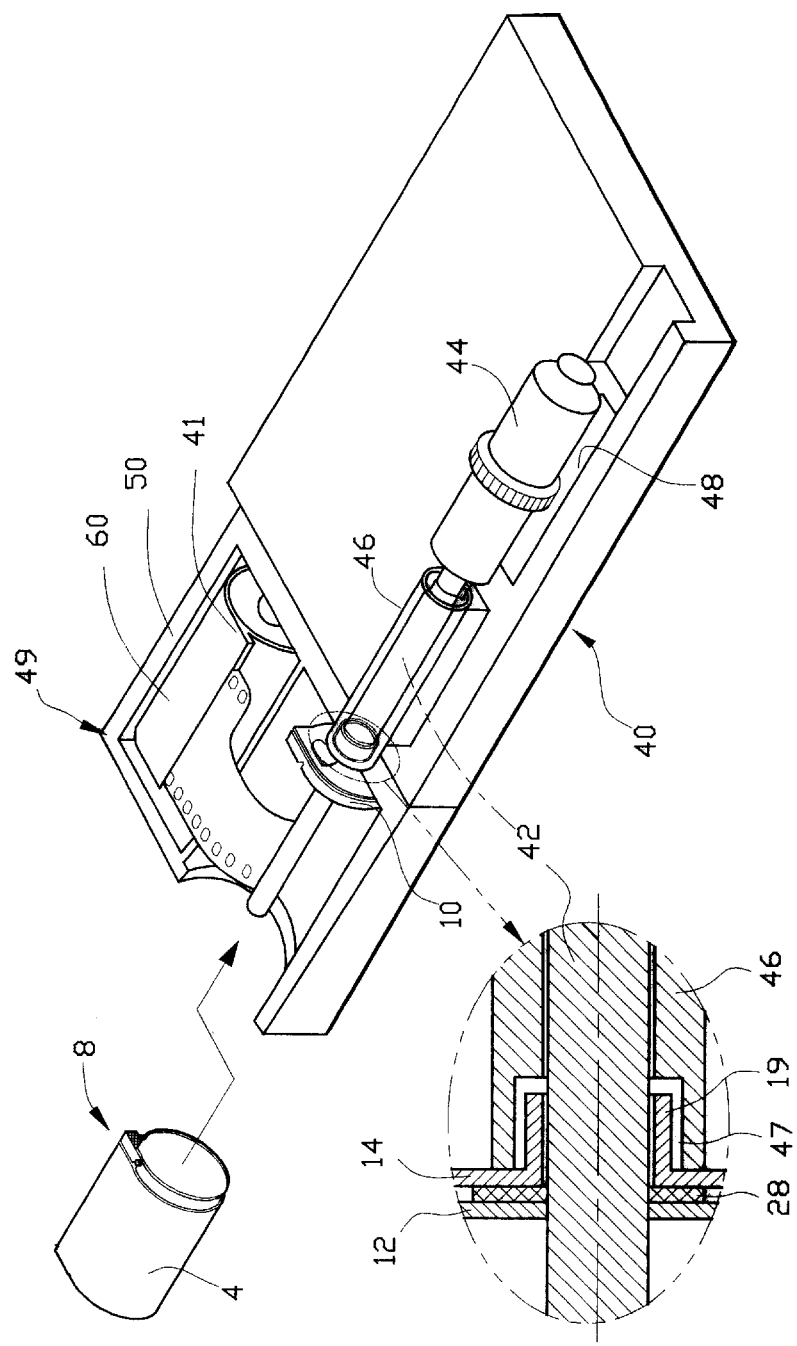
FIG. 3 illustrates the initial stage of winding of film into the film container from a film patrone in a winding jig.

The film loading procedure requires the use of a film-winding apparatus 40 as shown in FIG. 3. The apparatus 40 comprises an electric motor 44 supporting a film-winding tool 42 having a tool end which has a split end portion which receives the film end. The tool 42 extends through an elongate support sleeve 46 which makes a fairly close fit with the tool 42, an internal surface of the support 46 being lined with velvet or other suitable material which serves to prevent light from passing between the tool 42 and inner surface of the support 46. An end of the sleeve 46 is cut away to form a recess 47 into which the collar 19 may be received, as can be best seen in the inset of FIG. 3. The motor 44 and tool 42 are mounted on a slide platform 48 allowing the tool 42 to be retracted into the support sleeve 46 or extended so as to protrude therefrom.

A film-winding jig 49 is provided to support and enclose the film container 2 and film patrone 60, comprising a lower casing part 50 having chambers for receiving the film container 2 and patrone 60 and holding them relative to each other, and an upper cover part 52 which co-operates therewith to define a light-tight enclosure, leaving an opening through which the film winding tool 42 can be inserted.

Figure 4:
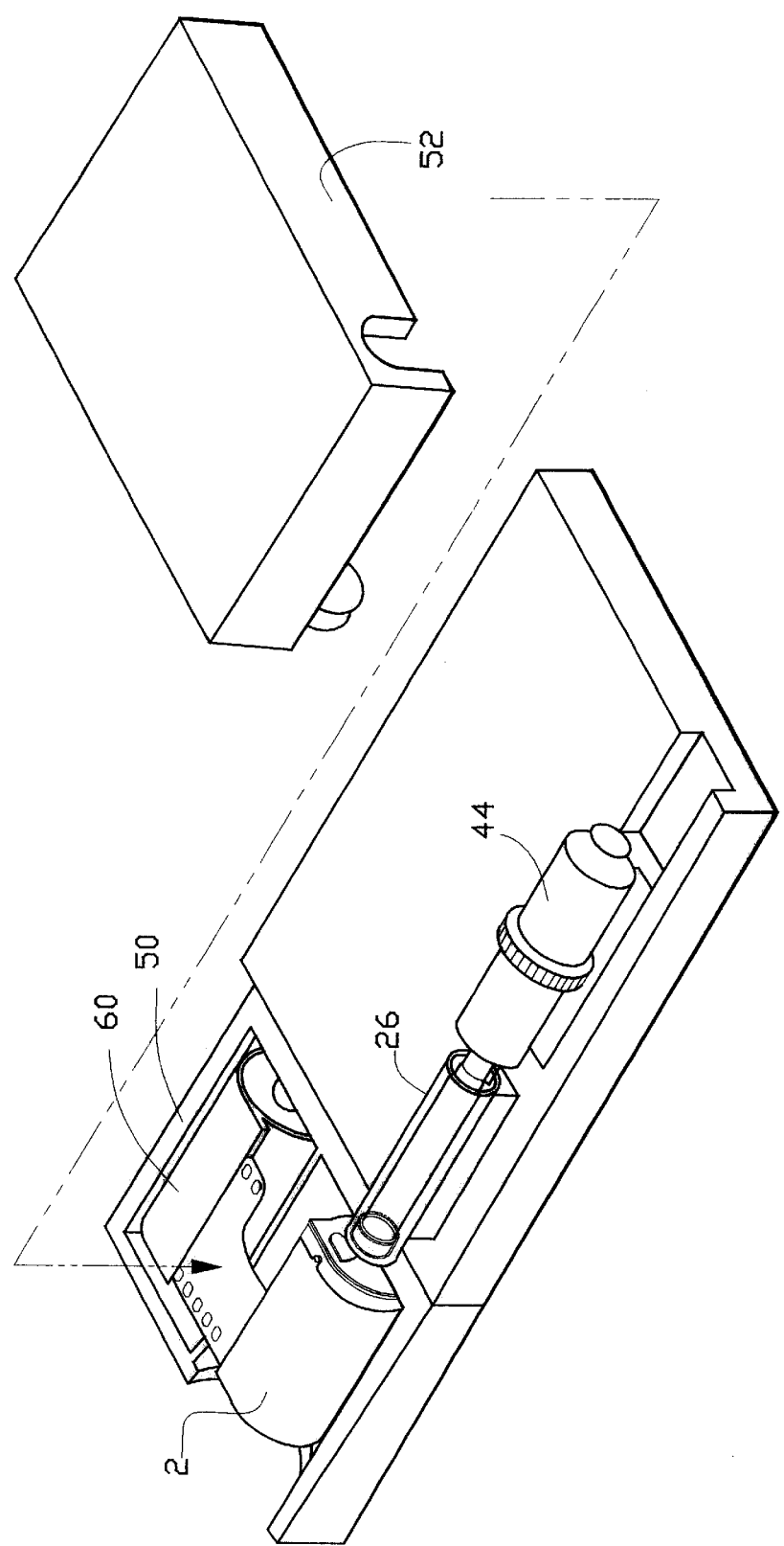
FIG. 4 shows the closing of the winding jig.

As shown in FIG. 3, with the end cover 10 removed from the housing 4 of the film container 2 the shutter 28 is opened by manually moving the protrusion 36 and the end cover 10 pushed over the end of the tool 42 which extends through the apertures 13, 15. A leading end of the film extending from the film patrone 41 is secured to the end of the tool 42 by inserting this through the split portion, and the housing 4 then inserted over the tool end 42 so that the film passes into the slot 8, moving the housing 4 towards the end cover 10 and making a snap-fit connection therewith, as is shown in FIG. 4. The collar 19 is received within the recess 47 of the sleeve 46, the end of the sleeve abutting the top of the outer plate 14 making a light-tight connection therewith.

Figure 5:
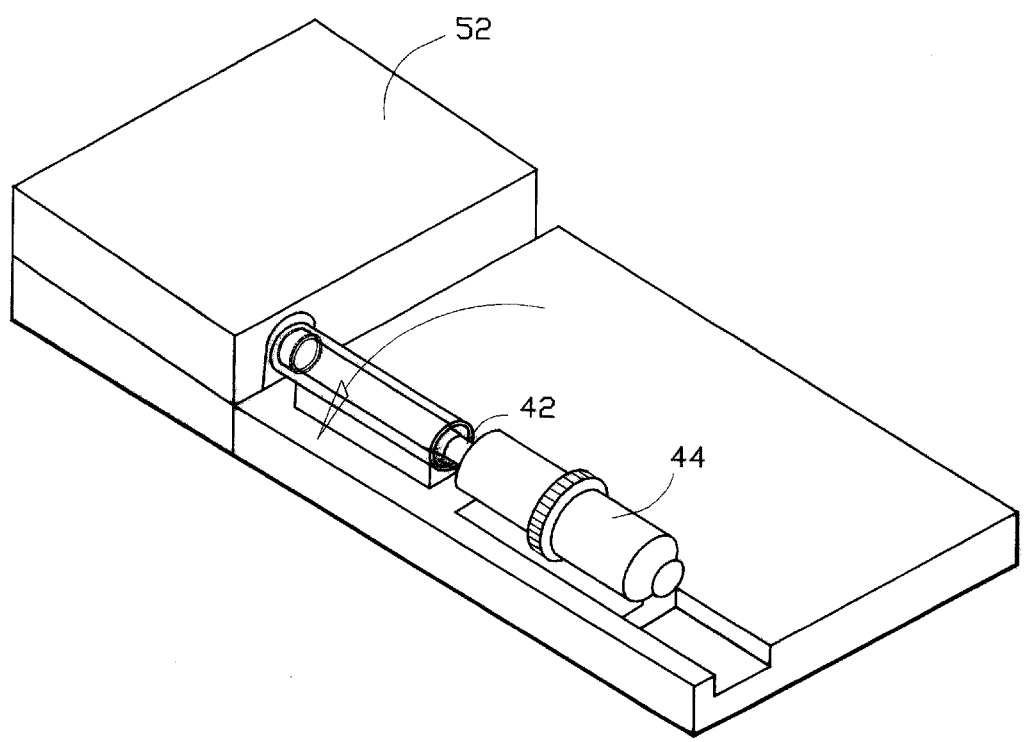
FIG. 5 shows the operation of film winding.
Figure 6:
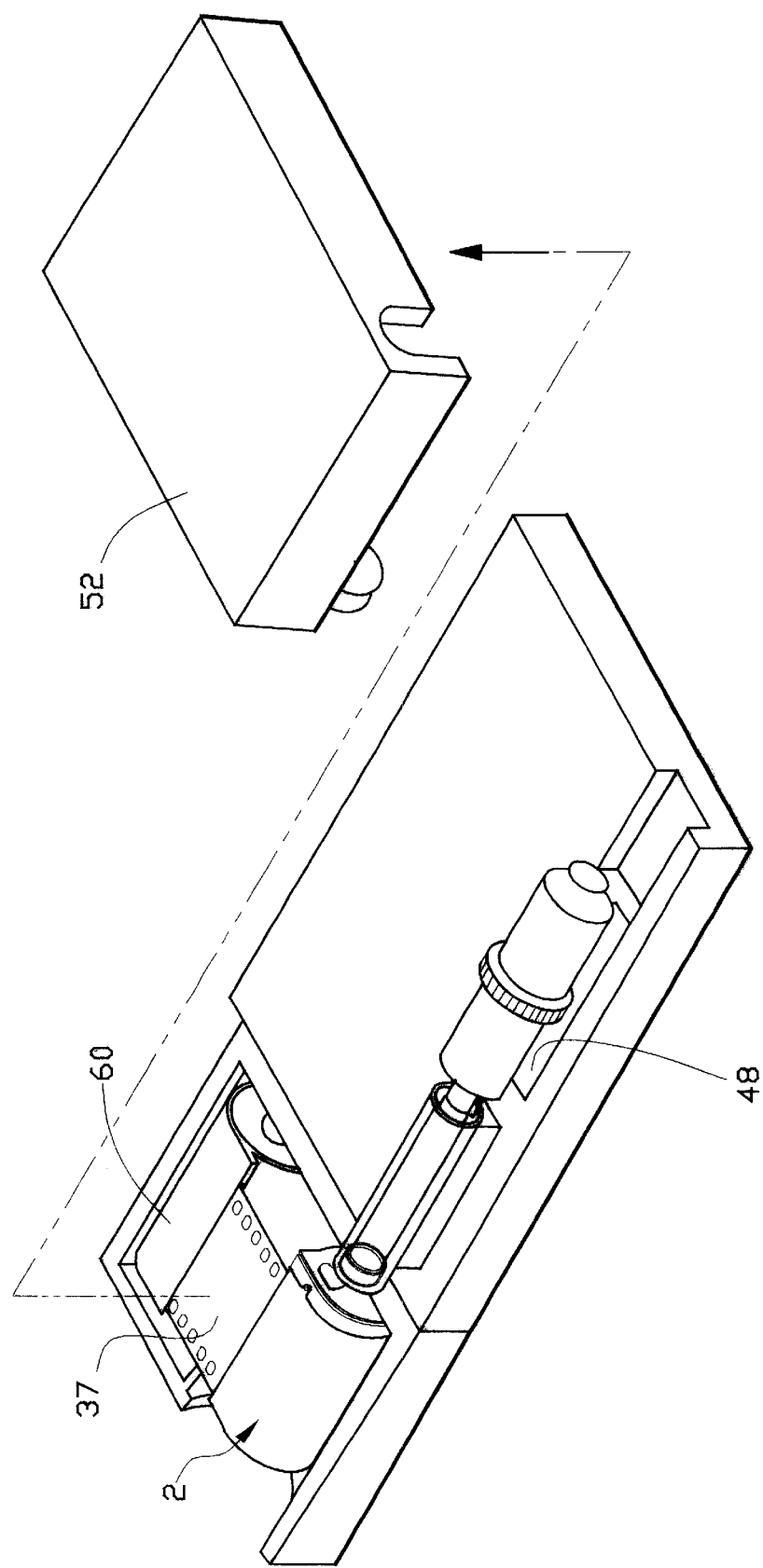
FIG. 6 shows the opening of the enclosure after film winding.

As indicated in FIG. 5, the motor 44 is operated so as to rotate the film winding tool 42, and winding film from the film patrone 60 and into the film container 2 where it forms a coil. The film winding stops automatically when the increased resistance is felt as the end of the film which is secured to the spool in the patrone is reached. The motor and tool end 42 are retracted by moving the slide 48 away from the jig, the tool end 42 detaching from the film, whilst keeping the end cover 10 abutting the support sleeve 46 to maintain the light-tight connection. As the tool end exits through the aperture in the end cover 10 the shutter snaps closed, rendering the container itself light-tight once more. The cover 52 is then removed and the film assembly having the majority of the film wound into the film container 2 is removed from the jig.

The film assembly comprising film container 2, film 37 and film patrone 60 may then be placed at the factory directly into a new camera for sale to a user. In this case it is advantageous to provide the assembly with a clip 62 in the form of a piece of bent resilient or springy plastics or metal formed into two essentially part-circular sections which are of a slightly smaller diameter than the respective film container 2 and patrone 60 so that they can fit tightly thereover. The clip 62 allows the containers to be held relatively securely at a fixed position relative to each other. The assembly is placed in a light-tight and air-tight package 64 which serves to protect the assembly from damage, dust, dirt, light and humidity which might otherwise serve to degrade the film before it is sold to the user. Such packages are commonly formed of plastics materials and may be multi-layer materials which may also include a metallized layer. The clip 62 also serves to protect the film and means that there is no pressure exerted on the film by the relative movement of the container and patrone which could otherwise tear or damage the film if the package is mishandled.

Figure 8:
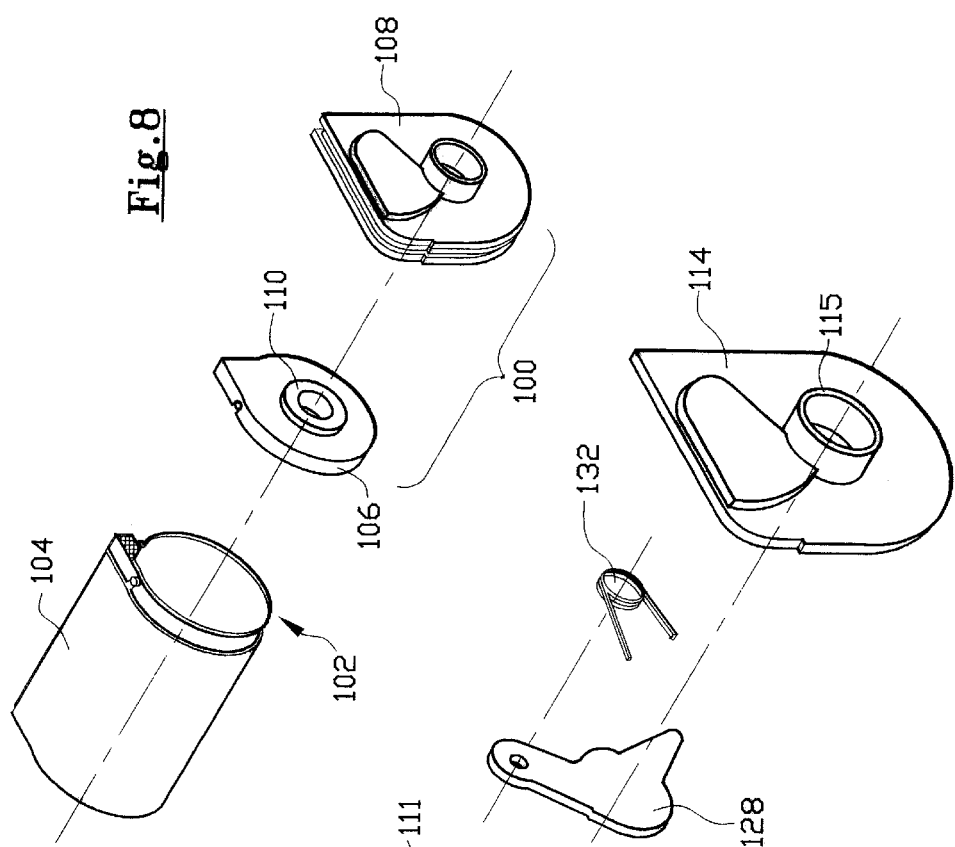
FIG. 8 shows a film container in accordance with a second embodiment of the invention.
Figure 9:
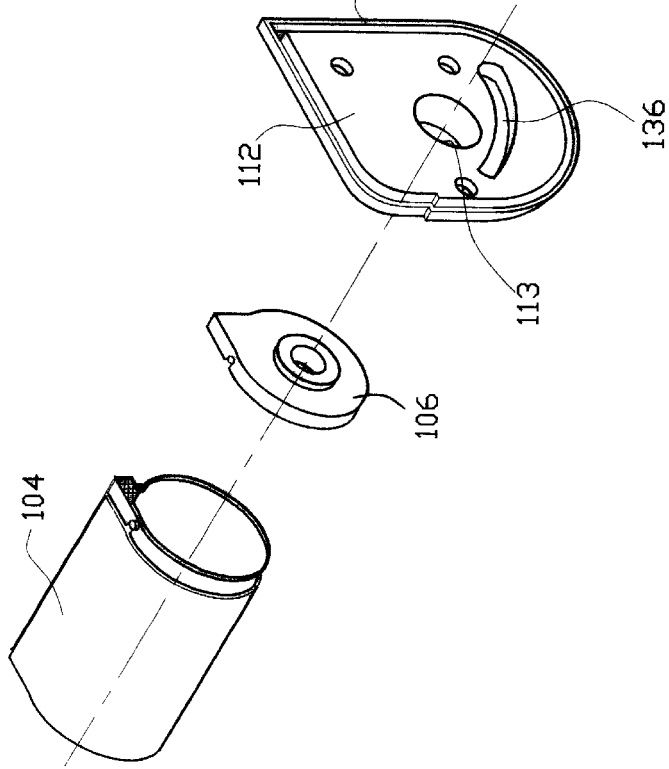
FIG. 9 is an exploded view of the film container of FIG. 8.
Figure 10:
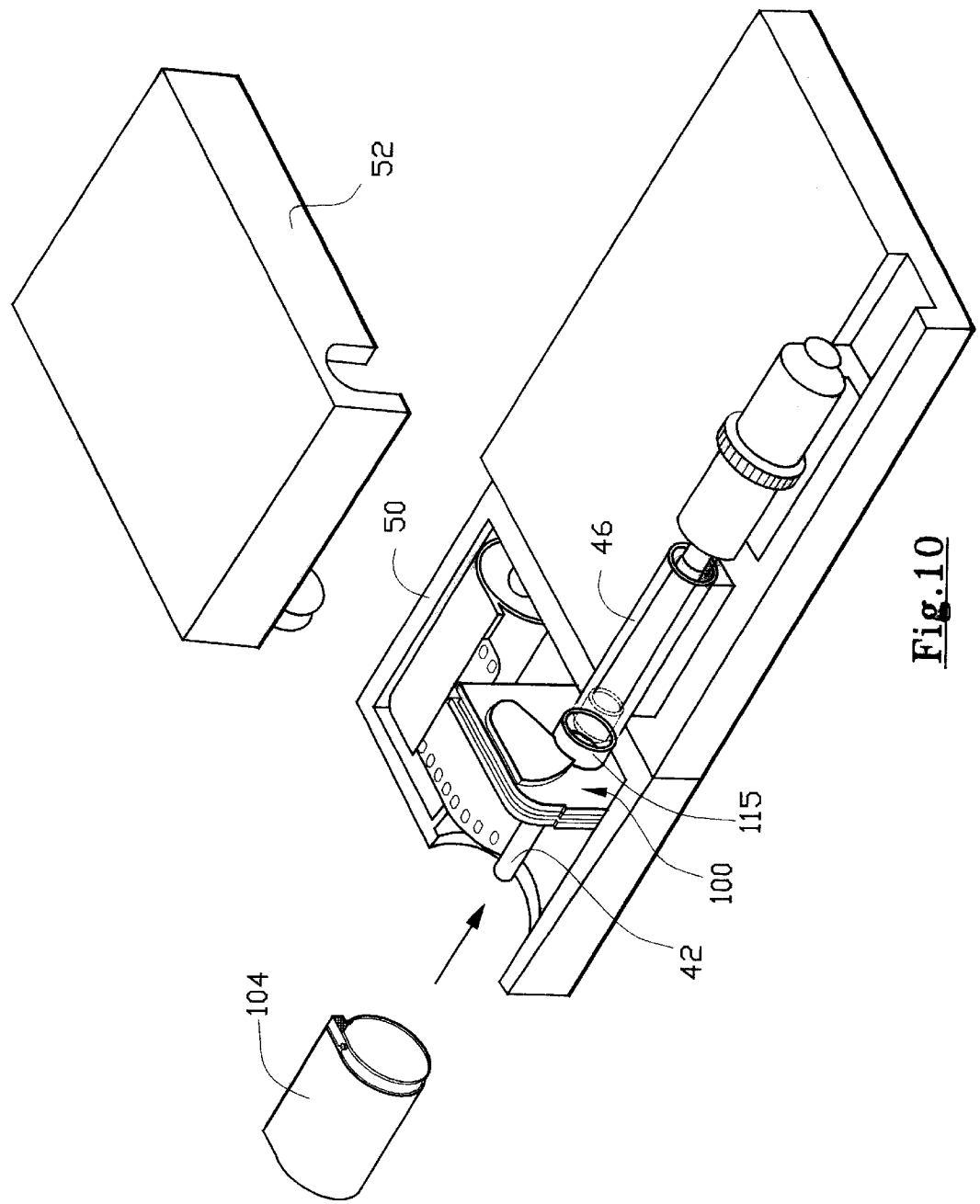
FIG. 10 illustrates the initial stage of film winding into the film container of FIGS. 8 and 9.
Figure 11:
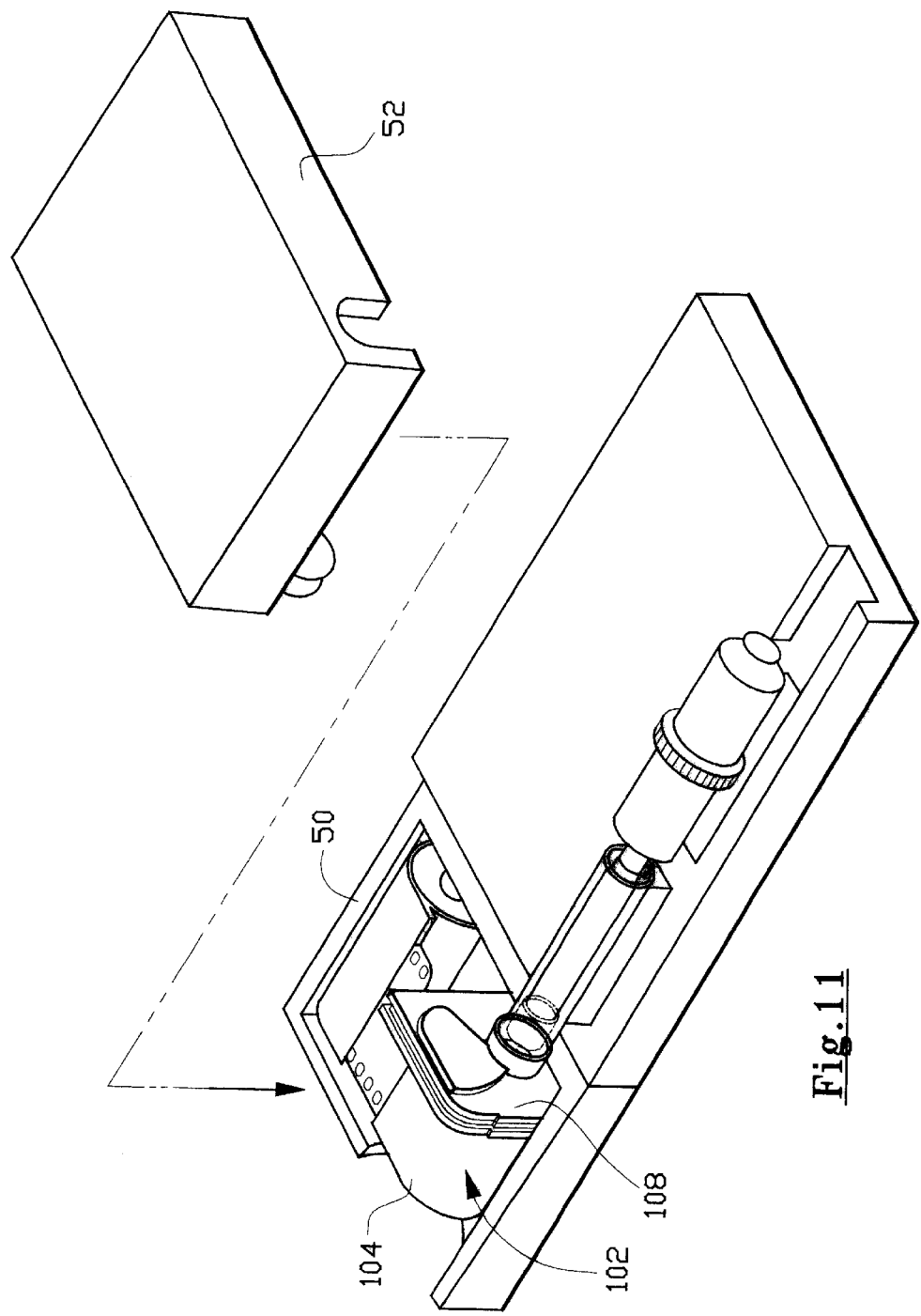
FIG. 11 shows the closing of the winding jig.
Figure 12:
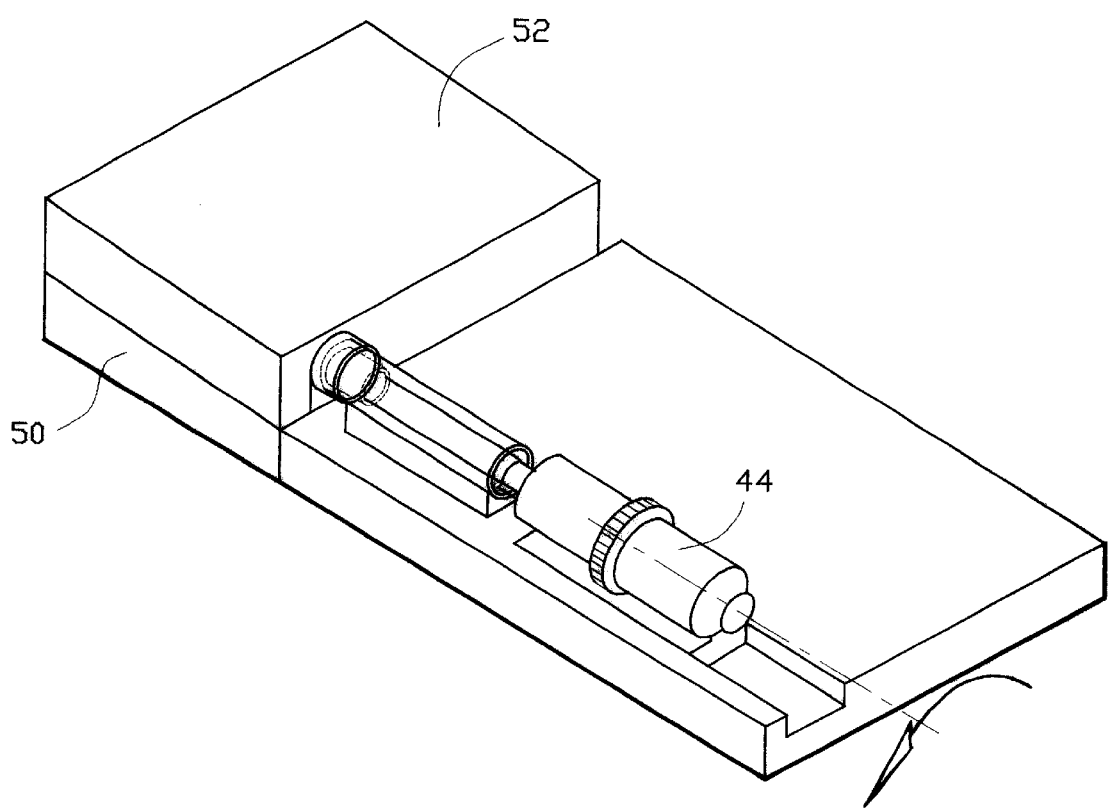
FIG. 12 shows the operation of film winding.
Figure 13:
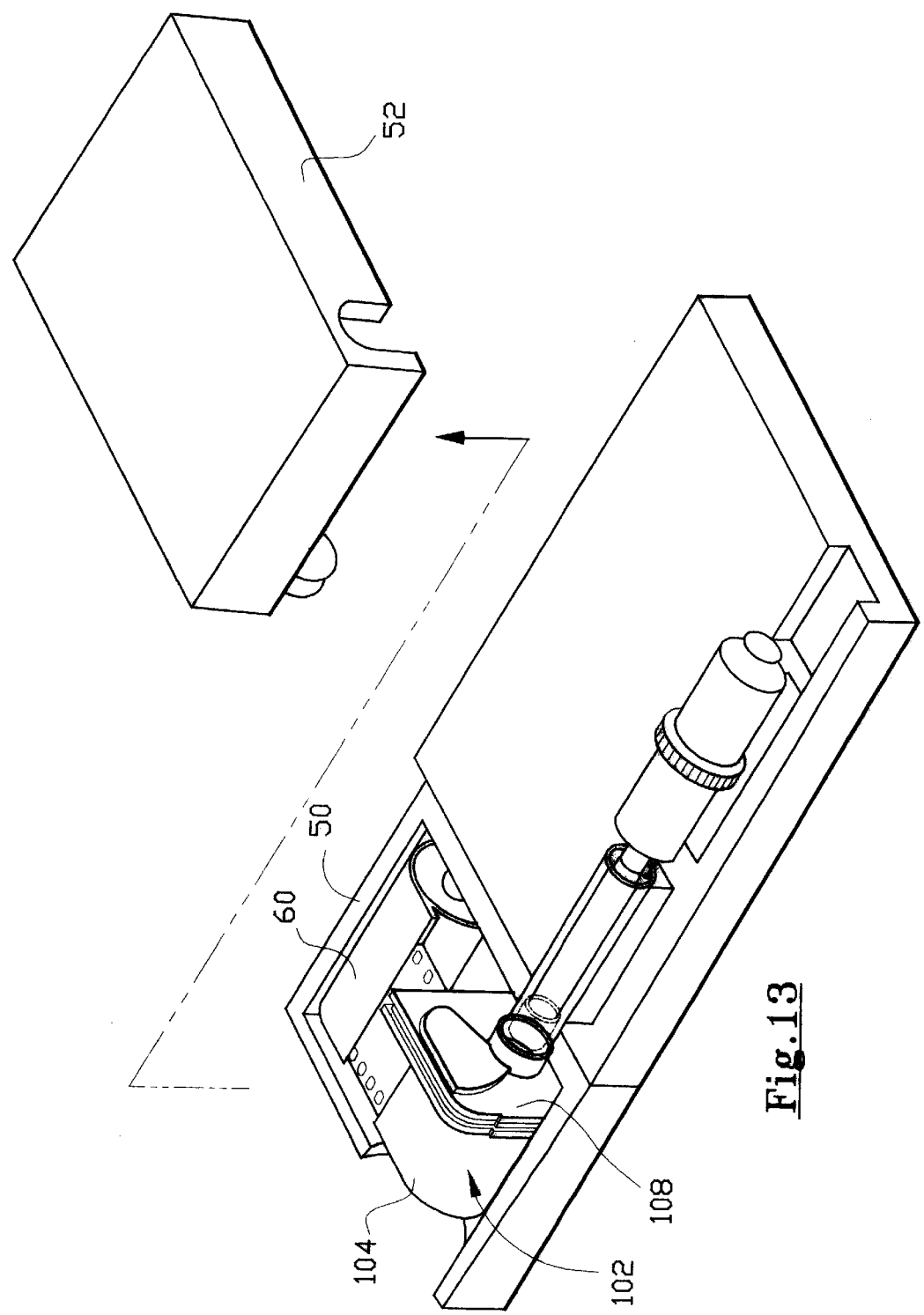
FIG. 13 shows the opening of the enclosure after film winding.
Figure 14:
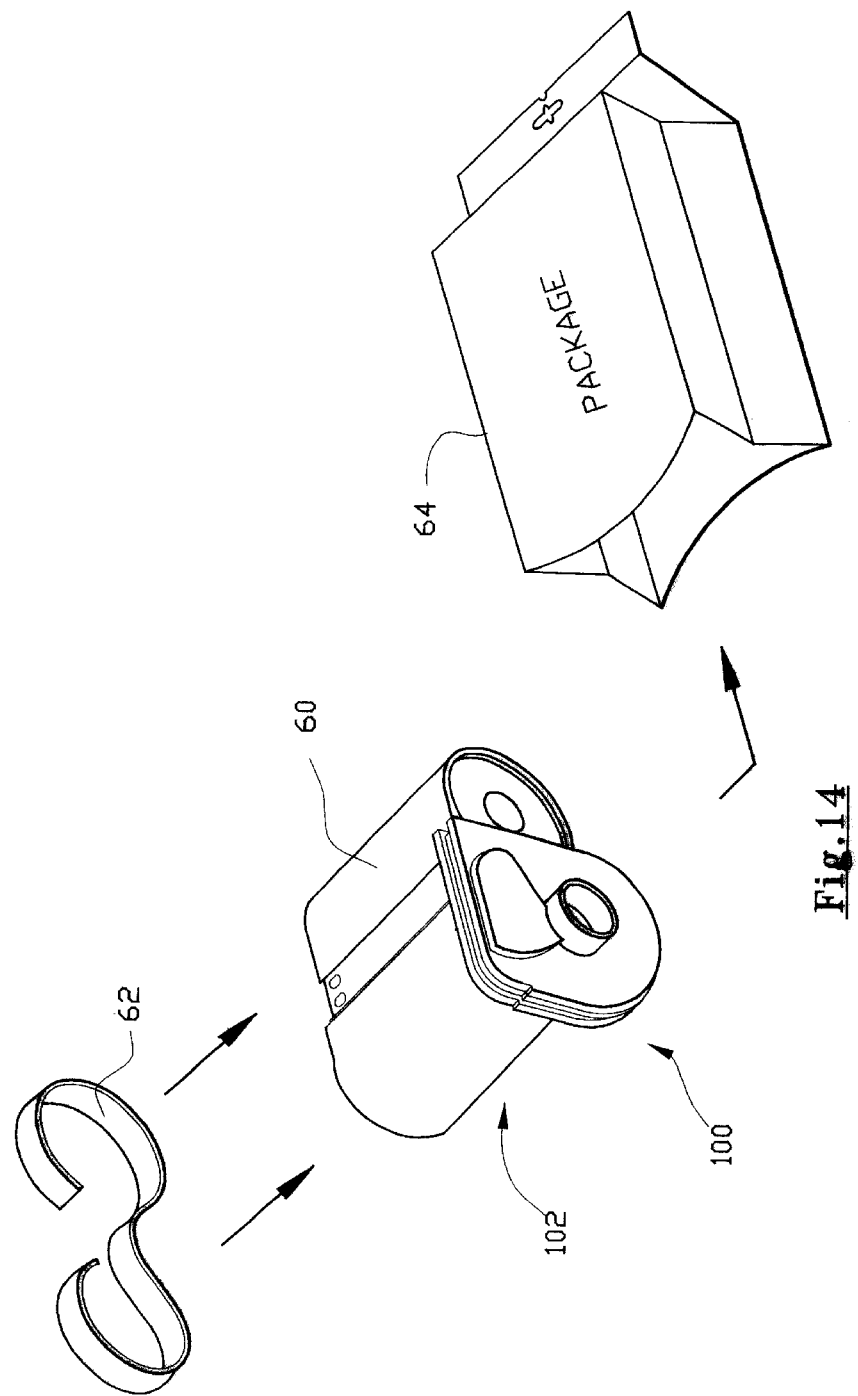
FIG. 14 shows the pre-wound film assembly being secured and sealed in an outer protective package.

A second embodiment of a film container which is generally designated 102 is illustrated in FIGS. 8 and 9. The container 102 has a housing 104 of identical construction to the first embodiment, and an end cover 100 which comprises an intermediate end cap 106 and an shutter-containing end plate 108. The cap 106 has a simple depending flange which fits over the end of the housing 104, and a short upstanding collar 110. The end plate 108 comprises an assembly which is a pair of plates 112 and 114, plate 112 having a peripheral upstanding rim 113 within which the plate 114 sits in spaced relationship therewith. Plate 112 has an arcuate slot 136 therein. A shutter blade 128 is arranged for pivotal movement, also biased into a closed position by spring 132. An arm of the shutter blade 128 carries a projection (not visible) which extends into the slot 136 allowing the user to move the blade 128. The intermediate cap 106 and end plate 108 are joined together by a simple push-fit of the collar 110 which fits into the aperture 113, and optionally in addition by the use of glue or welding or other simple fixing means if it is desired to permanently secure the parts together.

FIGS. 10 to 13 illustrate the loading of film into the container 102 which is carried out in a similar manner to the method described with reference to FIGS. 3 to 7, with like reference numerals used to illustrate like parts. Firstly, the shutter blade 128 is opened by engaging the projection thereof and the end plate is pushed over the end of the film-winding tool. Then, the end cap 106 is also pushed over the end of the winding tool 42, and the collar 110 pushed into the opening 113 to connect the two. The end of the collar 115 is pushed so as to abut the end of the sleeve 46. The film leading end is fitted to the split end of the tool 42 and the housing 104 pushed over the shaft end 42 so that the film protrudes through the film slot. The cover 52 is fitted and the motor operated to wind the film from out of the patrone and into the container 102. The cover 52 is removed, and the assembly secured by clip 62 and sealed in package 64.

Figure 15:
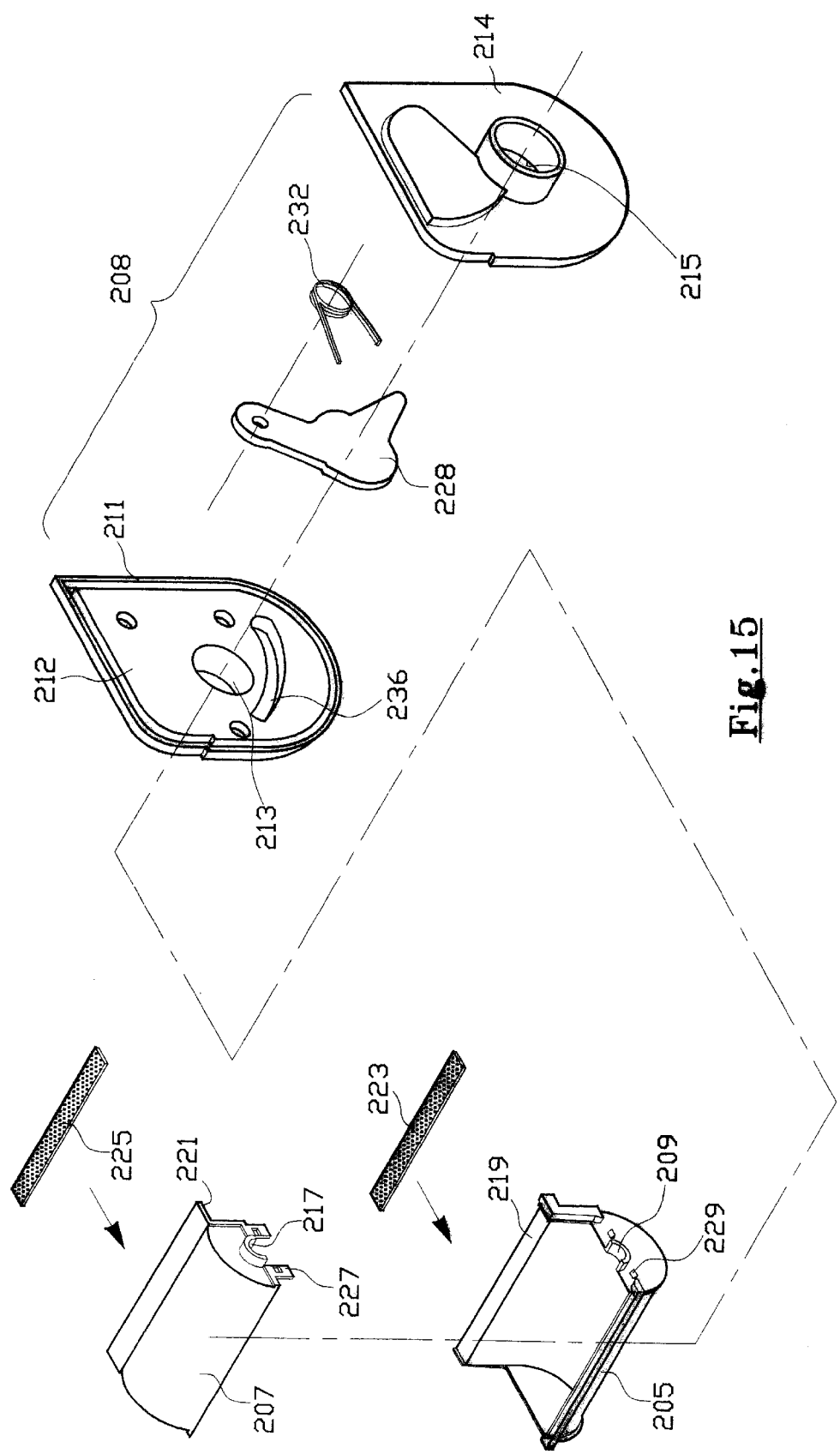
FIG. 15 shows a two-part film container in accordance with a third embodiment of the invention.
Figure 21:
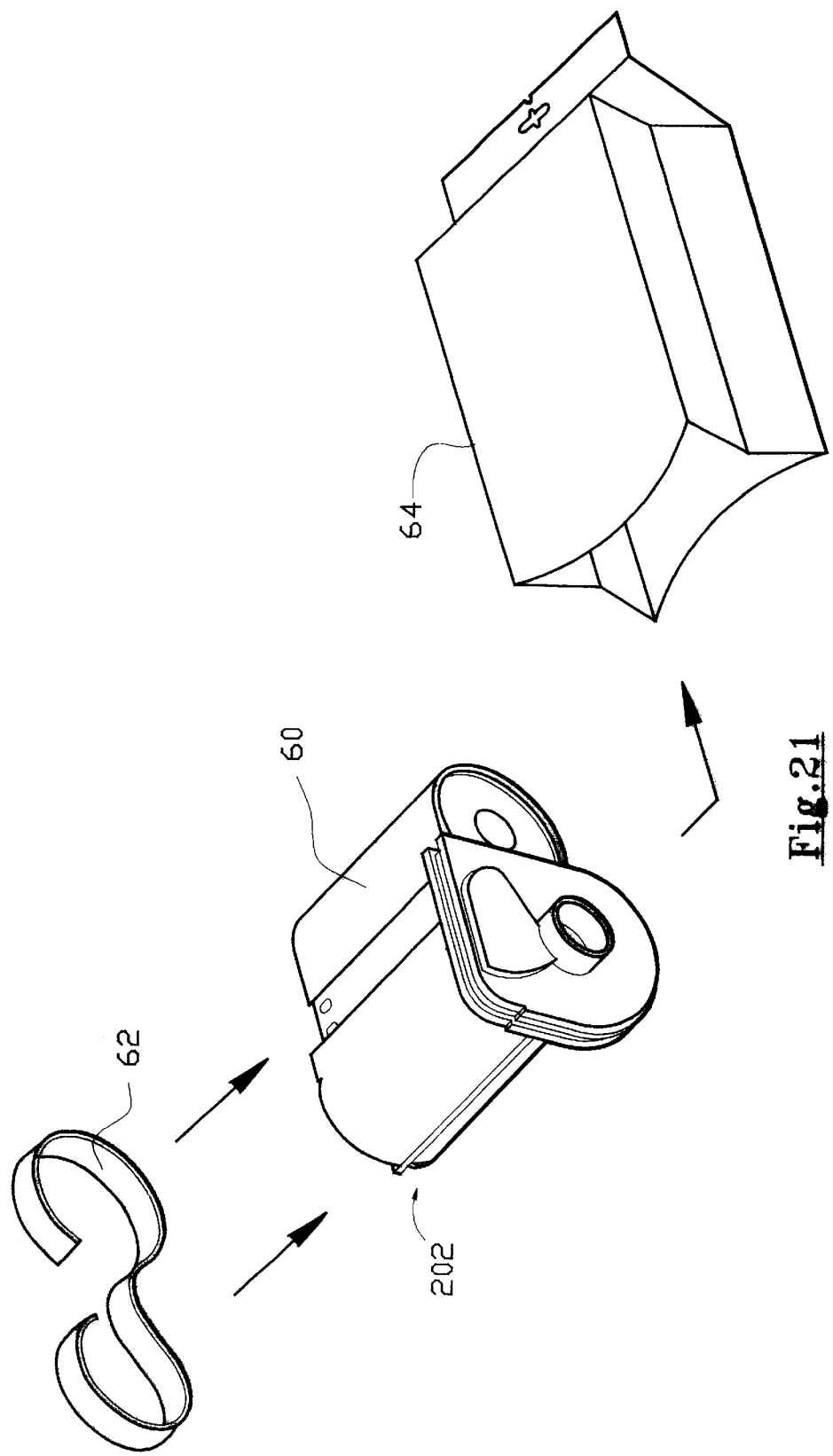
FIG. 21 shows the pre-wound assembly being secured and sealed in an outer protective package.

A third embodiment of a film container which is generally designated 202 is illustrated in FIG. 15 where it is shown in exploded form. The complete container 202 is shown assembled in FIG. 21. The film container 202 comprises a housing 204 which is formed as two housing shell halves 205, 207. The shell halves 205, 207 co-operate to form an enclosure having a circular aperture at one end, the opposed curved surfaces which define this being indicated 209, 217, and also define an elongate slot between opposed ledges 219, 221. The ledges 219, 221 are covered by strips 223, 225 of soft fabric-like material which may be secured by means of adhesive or double-sided tape. One or both shell halves may be provided with lugs 227 having apertures or recesses which snap-fit over protrusions 229 on the opposite shelf half to thereby secure the shell halves together. Alternatively, or additionally adhesive or welding may be used.

The container 202 also has an end plate 208 which is of identical construction to the end plate 108 of the second embodiment and will therefore not be further discussed. The end plate 208 fits onto the end of the housing 204, the collar 210 formed by the portion 209, 217 extending into the aperture 213.

Figure 16:
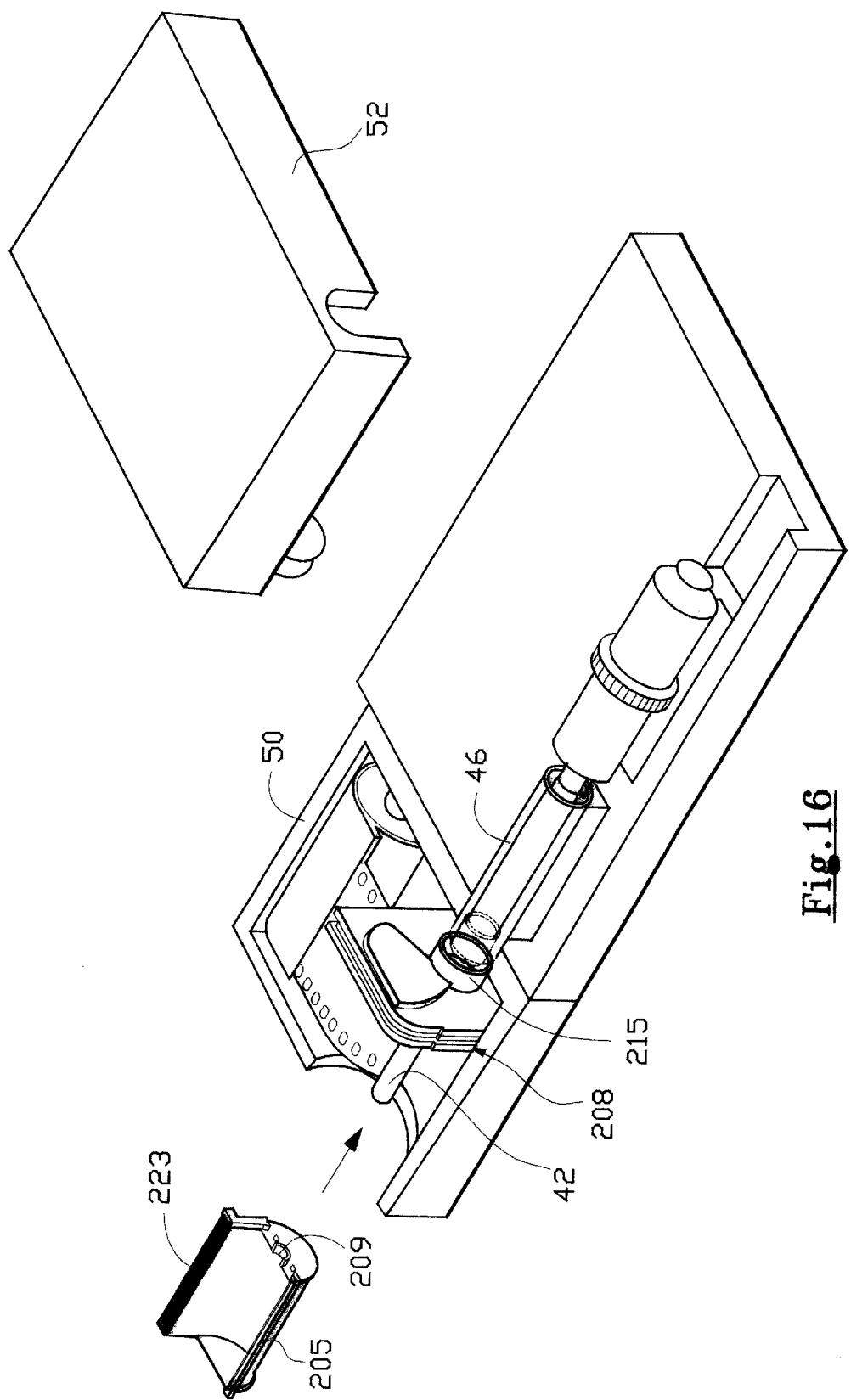
FIG. 16 illustrates the initial stage of winding of film into the film container of FIG. 15 from a film patrone in a winding jig.
Figure 17:
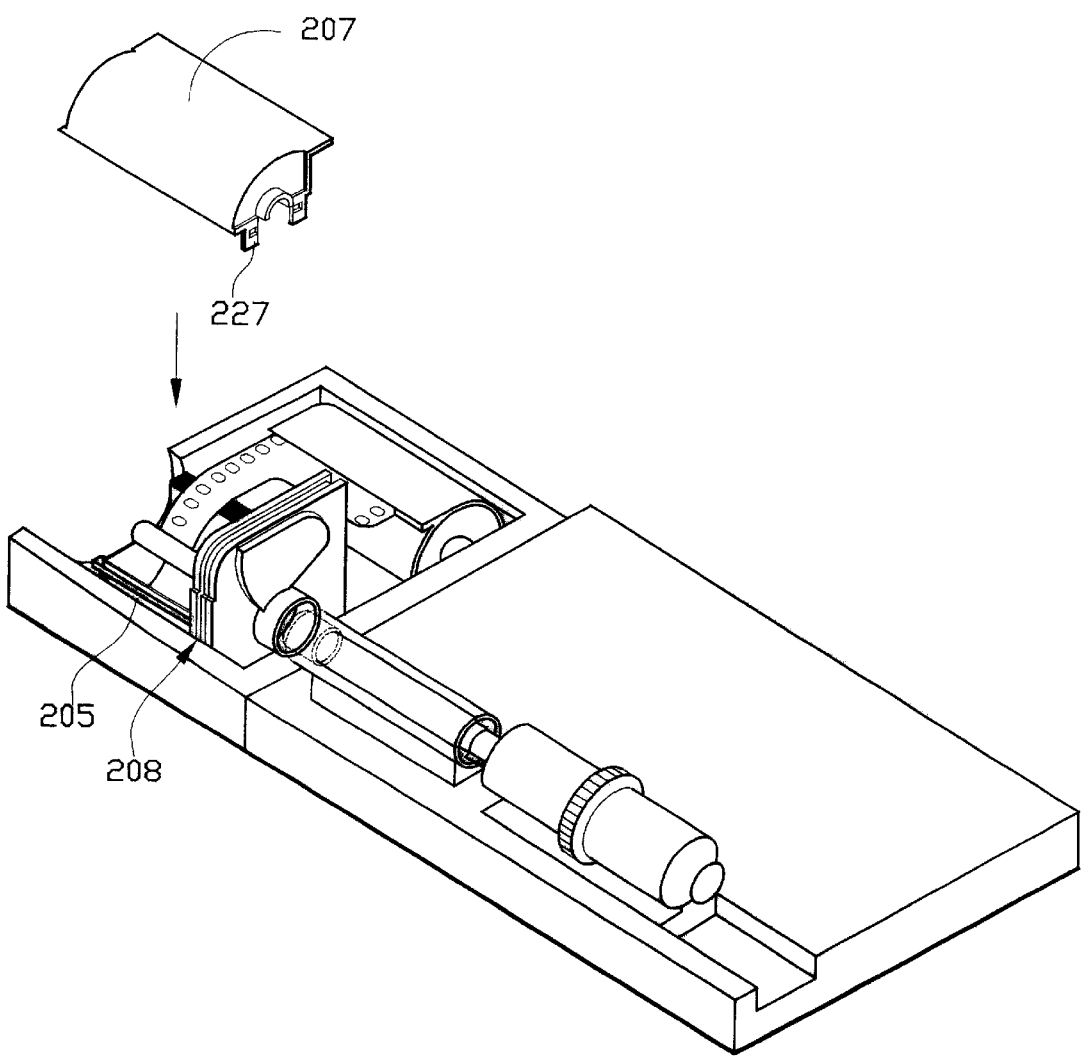
FIG. 17 shows the fitting of a second housing part of the film container.
Figure 18:
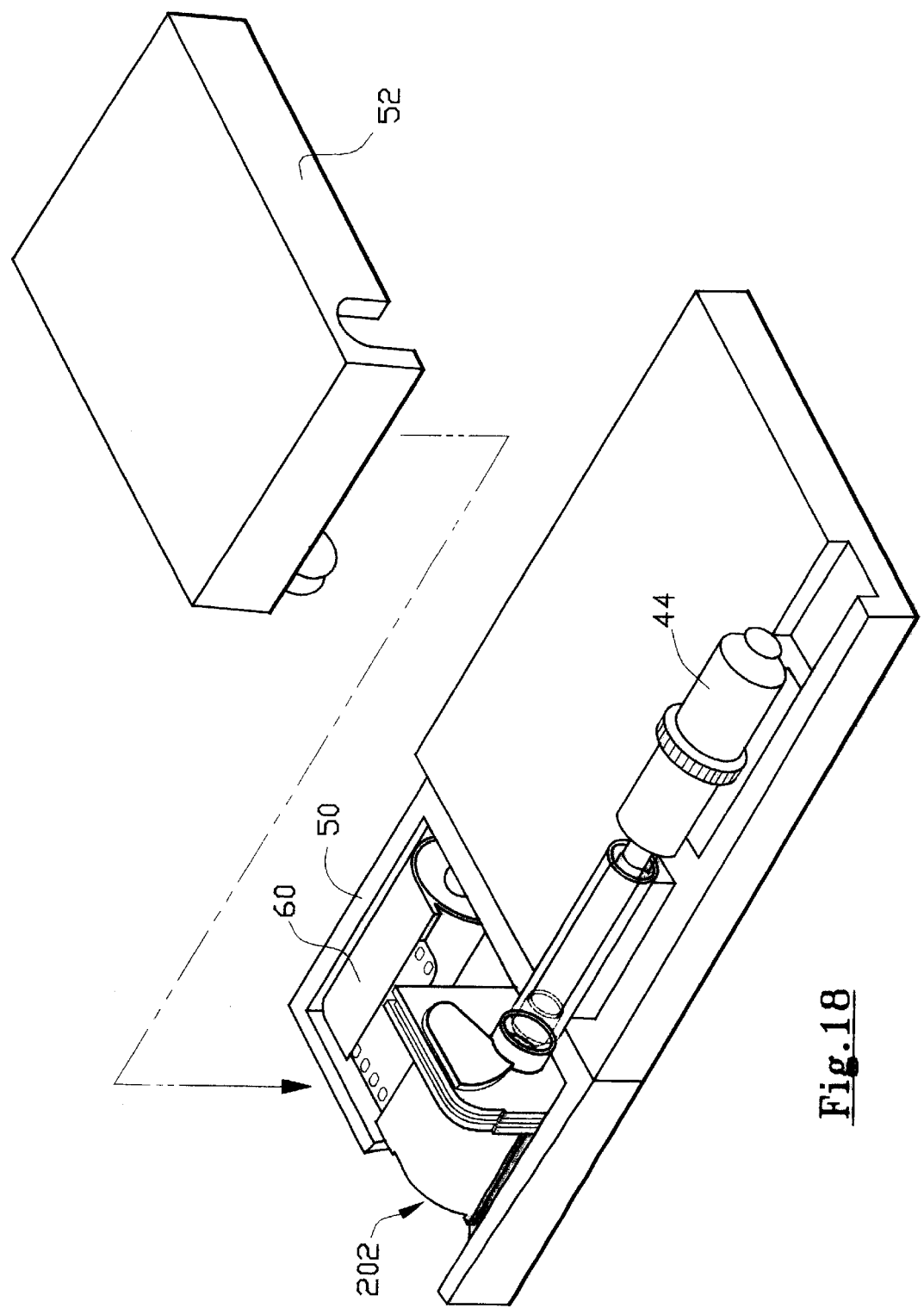
FIG. 18 shows the closing of the winding jig.
Figure 19:
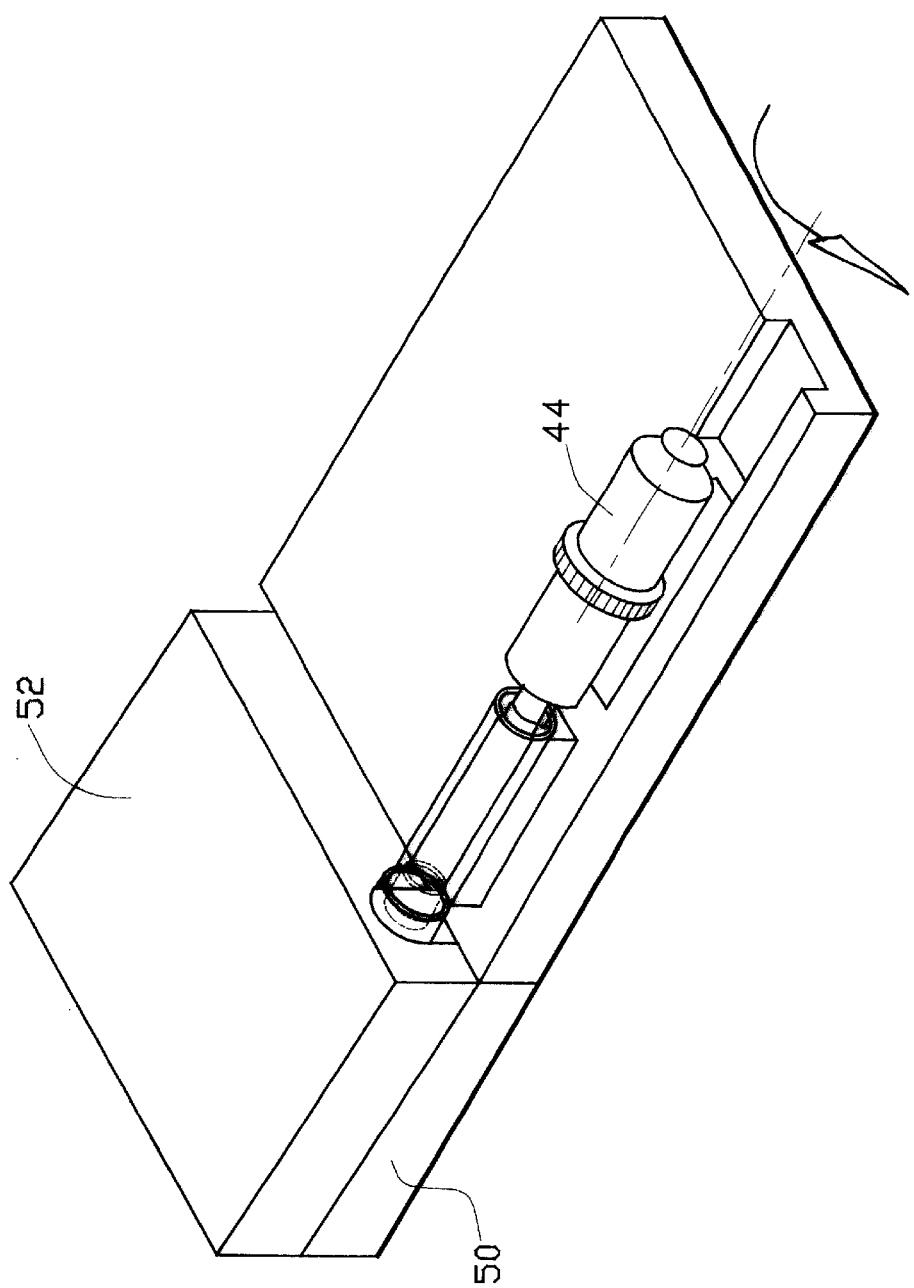
FIG. 19 shows the operation of film winding.
Figure 20:
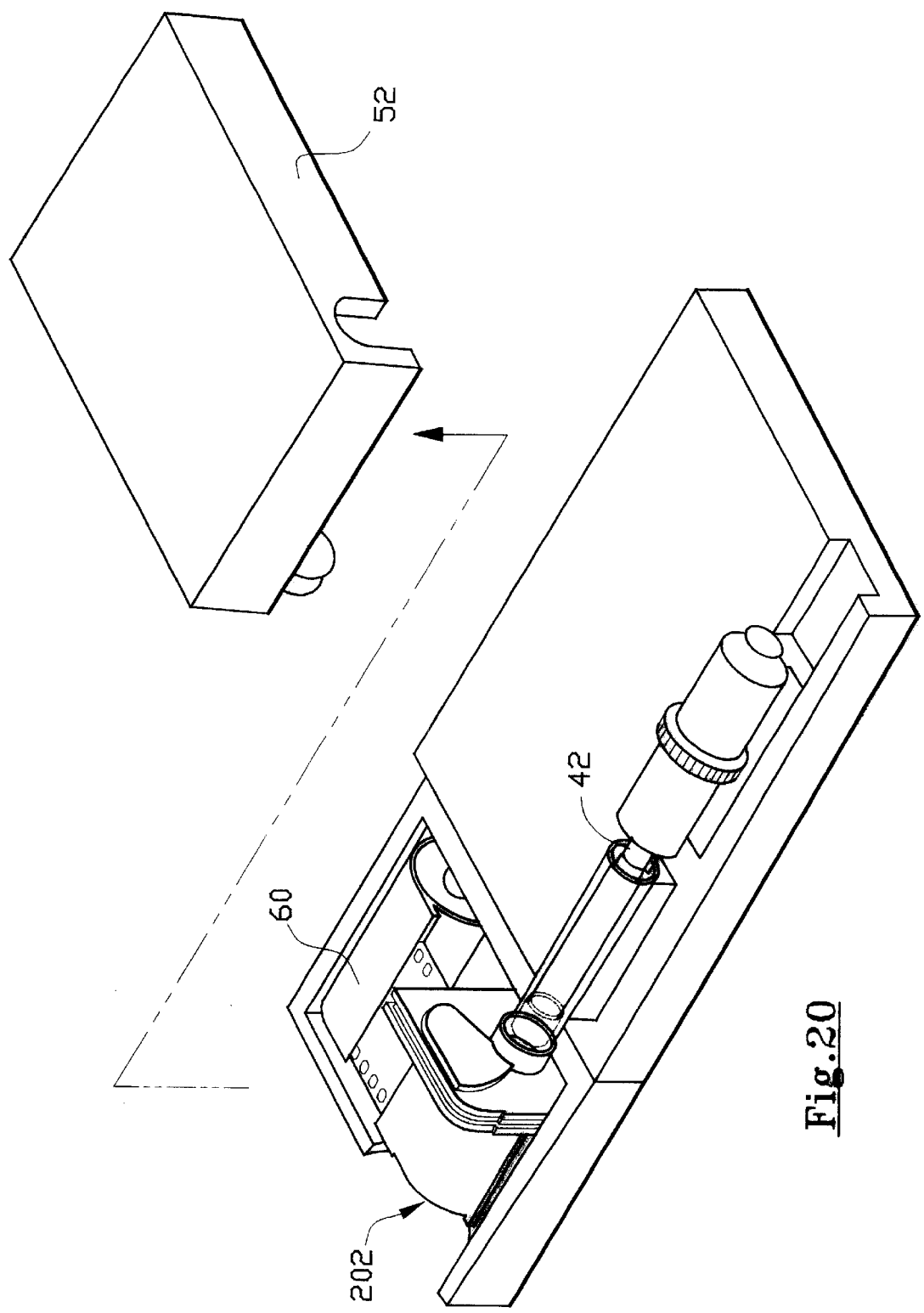
FIG. 20 shows the opening of the enclosure after film winding.

FIGS. 16 to 20 illustrate the loading of film into the container 202, with identical tarts of the loading and winding apparatus being indicated by like reference numerals. In FIG. 16 the shutter blade 228 is opened by accessing the projection on the arm of the blade 228 which protrudes through the slot 236,as can be seen in FIG. 15. With the shutter blade 228 open the end plate 208 is fitted over the end of the tool 42 so that the collar 215 abuts the end of the sleeve. The leading end of the film is then secured onto the split end portion of the tool 42. The lower shell half 205 of the housing 204 is then fitted into the jig 50 so that it lies underneath the tool 42 with the tool 42 resting on the surface 209. As indicated in FIG. 17, the upper shell half 207 is then push-fitted onto the lower shell half 205 with the lugs making a snap-fit connection therewith, with the film extending through the velvet-lined slot. The cover 52 is fitted as indicated in FIG. 18, and the the back cover 308 so that the apertures 327 clear the protrusions 325.

A particular advantage of the construction of the container 202 and specifically the two-piece construction of the housing namely the two shell halves 205, 207 is that it is considerably easier to affix the strips of velvet or other soft material to the ledges 219, 221 which are easily accessible, in contrast to the containers having a one-piece housing where access to the film slot to attach strips of velvet or similar is more difficult.

Figure 22:
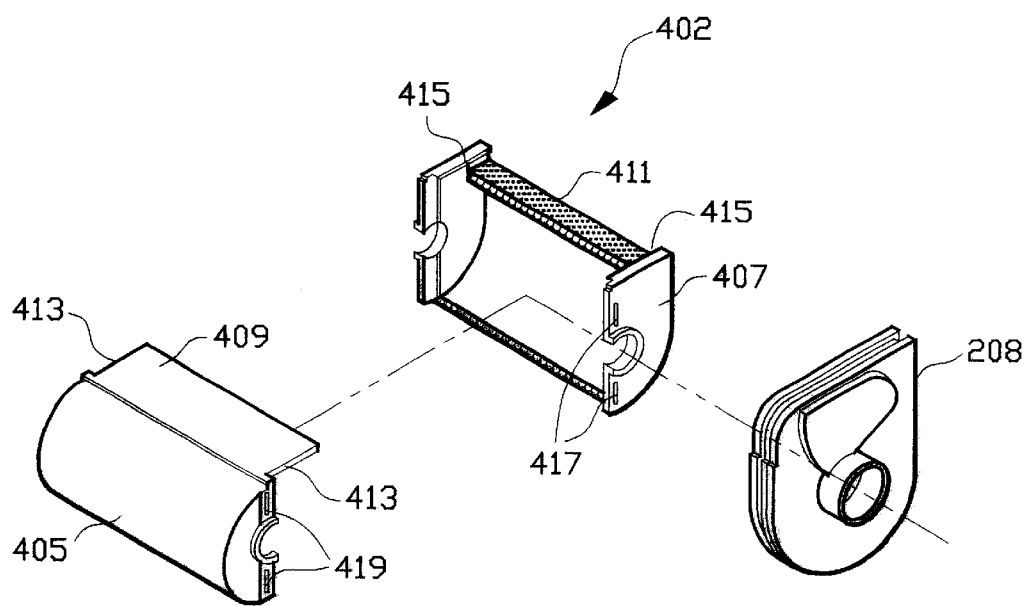
FIG. 22 shows a further alternative construction being a fourth embodiment of film container.

A further alternative structure of film container 402 being a fourth embodiment of film container is shown in FIG. 22. This is similar to that of the third embodiment in that the housing comprises a pair of shell halves; however, instead of being divided about a plane which is generally parallel to the plane defined by the exiting film, the housing is divided about a plane perpendicular thereto into shell halves 405, 407. A similar arrangement of protrusions and apertures or recesses is provided to allow the two shell halves to be snap-fitted together. An identical end cover 208 is provided. Shell half 405 has an extended ledge 409 which overlies ledge 411 defining the film slot therebetween, each having a strip of velvet secured thereto. The ledge 409 is provided with edge regions 413 of reduced thickness which slide into slots 415 on the shell half 407. The shell half 407 is also provided with projections 417 which snap-fit into slots 419 on the shell half 405 assisting to hold the two shell halves together. An identical film loading method to that described above in relation to the third embodiment is utilized, noting that the shell half 407 is fitted into the jig first, followed by the shell half 405.

The provision of the film assembly allows a user to re-load at least a small number of times his simple camera without himself having to carry out any kind of pre-wind operation.

The use of the specially adapted containers 2, 102, 202 402 having the shuttered aperture for the film winding tool allows the film winding process to be carried out within a simple, compact, light-tight enclosure, allowing the film winder to operate in daylight rather than in a darkroom, and thereby increasing the efficiency of the assembly process.

Figure 23:
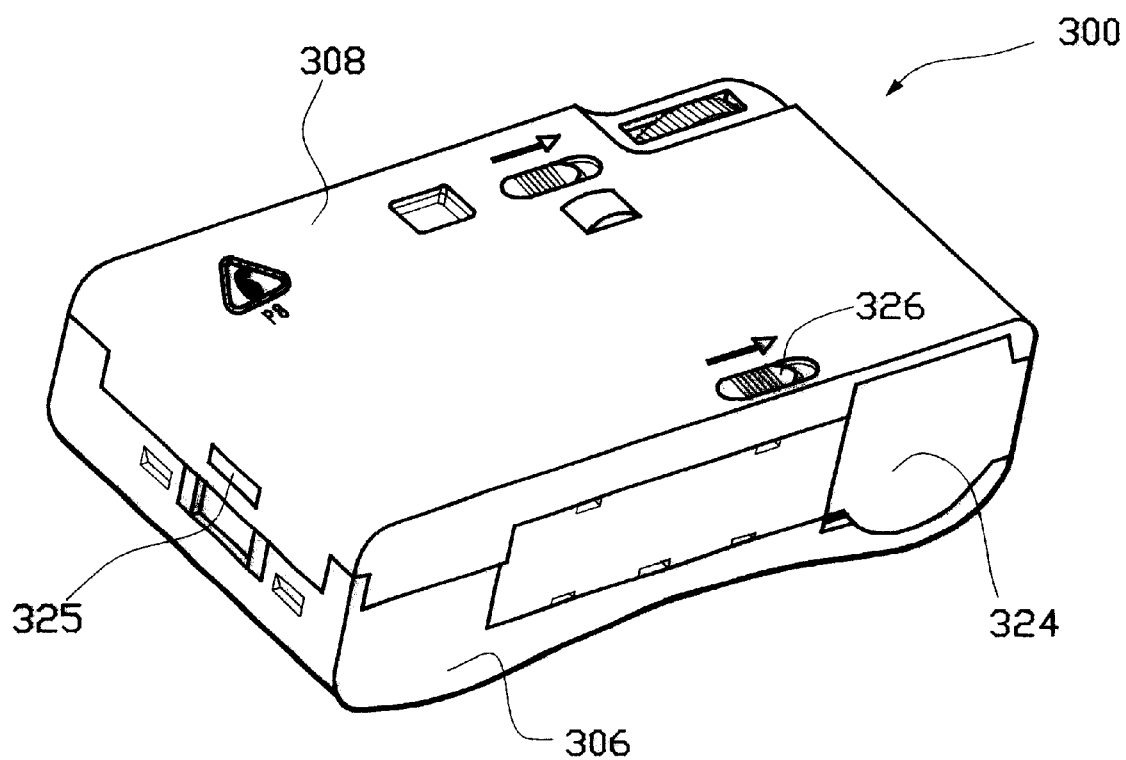
FIG. 23 shows a camera, and the initial step of opening the camera.
Figure 24:
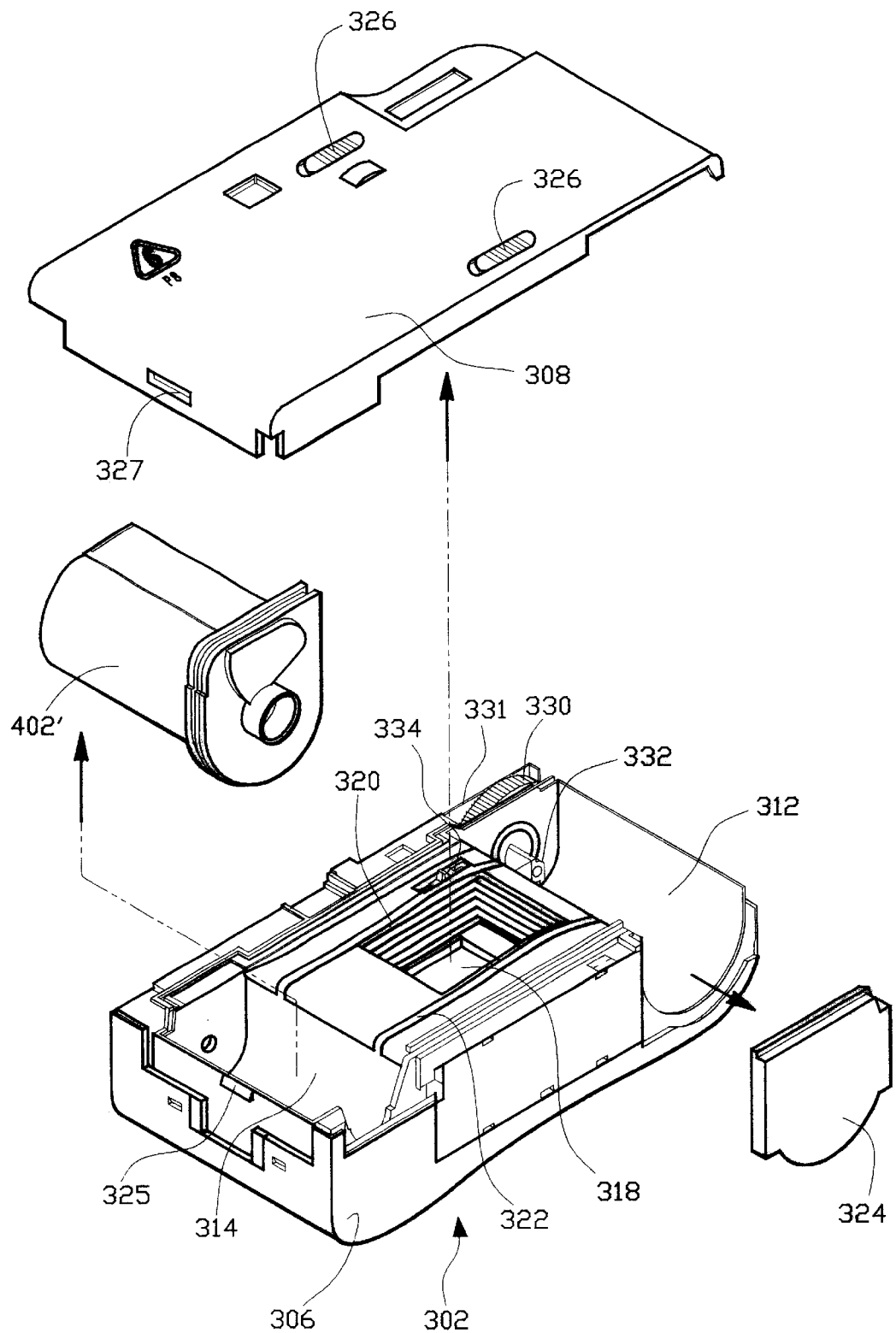
FIG. 24 shows the opening of the camera back and removal of a used film container.

FIGS. 23 to 26 illustrate the loading of the film assembly into a camera. As best seen in FIG. 24, the camera, indicated generally by numeral 300, is of simple construction and includes a main body part 302 which carries the majority of the operative components of the camera, and a front cover part 306 and rear cover part 308 which together enclose the main body 302. The main body 302 supports a lens assembly (not visible), a front portion of which extends through an aperture in the front cover part 306, and behind which is arranged an exposure shutter assembly as is entirely conventional and well understood by those skilled in the art. The main body 302 defines part of a first film-cassette receiving chamber 312 which receives a film-containing cassette or patrone 60 which is preferably a conventional 35 mm patrone having a central rotatable spool on which the film is wound. Other standard film formats can equally be accommodated with appropriate modification. A second film receiving chamber 314 is arranged at the opposite side of the camera. Between the film chambers 312 and 314 is arranged an exposure window 318 located between upper and lower film guides 320, 322 which support the film at its edges as it extends between the film chambers. A film passageway for the film to travel between the film chambers 312 and 314 is defined between the back cover 308 and opposed region of the main body 302 and film guides 320, 322. The main body 302, and front and rear cover parts 306, 308 define an opening at the lower end of the film cassette chamber 312, which is closed in use by a removable cover plate 324, allowing removal of the film cassette 60 through the opening once the film has been exposed. As is known in the art, the cover plate 324 and adjacent parts of the main body 302 are provided with appropriate adaptations in the form of co-operating grooves on the cover plate 324 and flanges on the main body 302 which together ensure light-tight closure of the opening.

The rear cover part 308 is removably fitted to the main body 302. This is achieved by providing at opposite edges a protrusion 325 on the main body 302 which snap-fits into an aperture 327 on the back cover 308. The back cover 308 may also be provided with releasable locking means or a latch including a pair of finger slides 326 having an inwardly directed movable pin (not visible) on the rear cover 308, movable between an open position as shown in FIG. 23 where the rear cover 308 can be simply push-fitted on to the rear of the main body 302 with the pin extending into a recess formed on the main body, and a locking position where the pin engages beneath a lug moulded on the main body 302. FIG. 23 shows the direction of movement of the slide 326 to achieve unlocking. These arrangements allow the user to readily open and close the camera for re-loading films therein.

As is conventional, the camera is provided with a wind-on mechanism including a rotatable film advance wheel or thumb wheel 330 held on top of the main body 302 beneath a plate 331 having a plurality of teeth, and lower shaped drive shaft 332 which extends into and engages the central spool of a conventional film patrone 60. The mechanism includes a film sprocket wheel 334 located just above the film exposure window 318, and a film counter. The film sprocket wheel 334 is operatively connected to the re-cocking mechanism of the shutter, so that each time the film is wound on one frame by the user (by turning the film advance wheel), the film sprocket wheel is rotated one turn, which brings a lever of the shutter back to its primed position, and in addition prevents further rotation of the film advance wheel 330, as is conventional.

FIGS. 23 to 26 illustrate the sequence of steps to be followed by a user in re-loading the camera with fresh film, or by a loader at the factory. The first step is the opening of the camera back 308 by sliding the latches 326 to the right and levering off the opposite edges of the back cover 308 so that the apertures 327 clear the protrusions 325.

Figure 25:
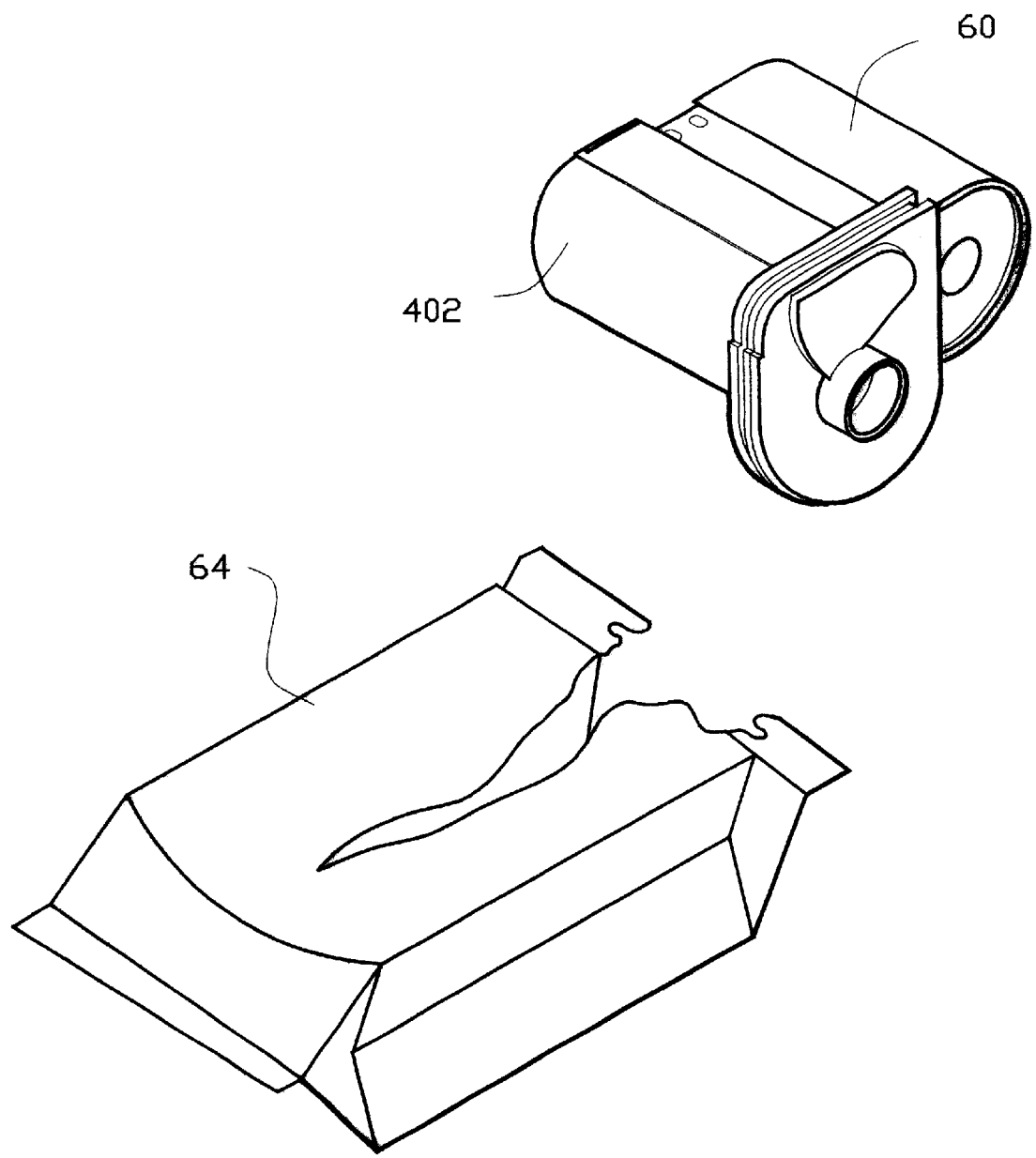
FIG. 25 shows the opening of a package and the removal of a film assembly.

As indicated in FIG. 25, the package 64 is torn or cut open and the assembly of film containers 402, 60 and film held together with the clip 62 (the clip 62 is not illustrated) is removed from the package 64, and the clip removed. Although only the fourth embodiment of the film container 402 is shown the method is equally applicable to the first, second and third embodiments 2, 102, 202. If the loading is the first loading at the factory, the film assembly may not be contained in such a package 64.

Figure 26:
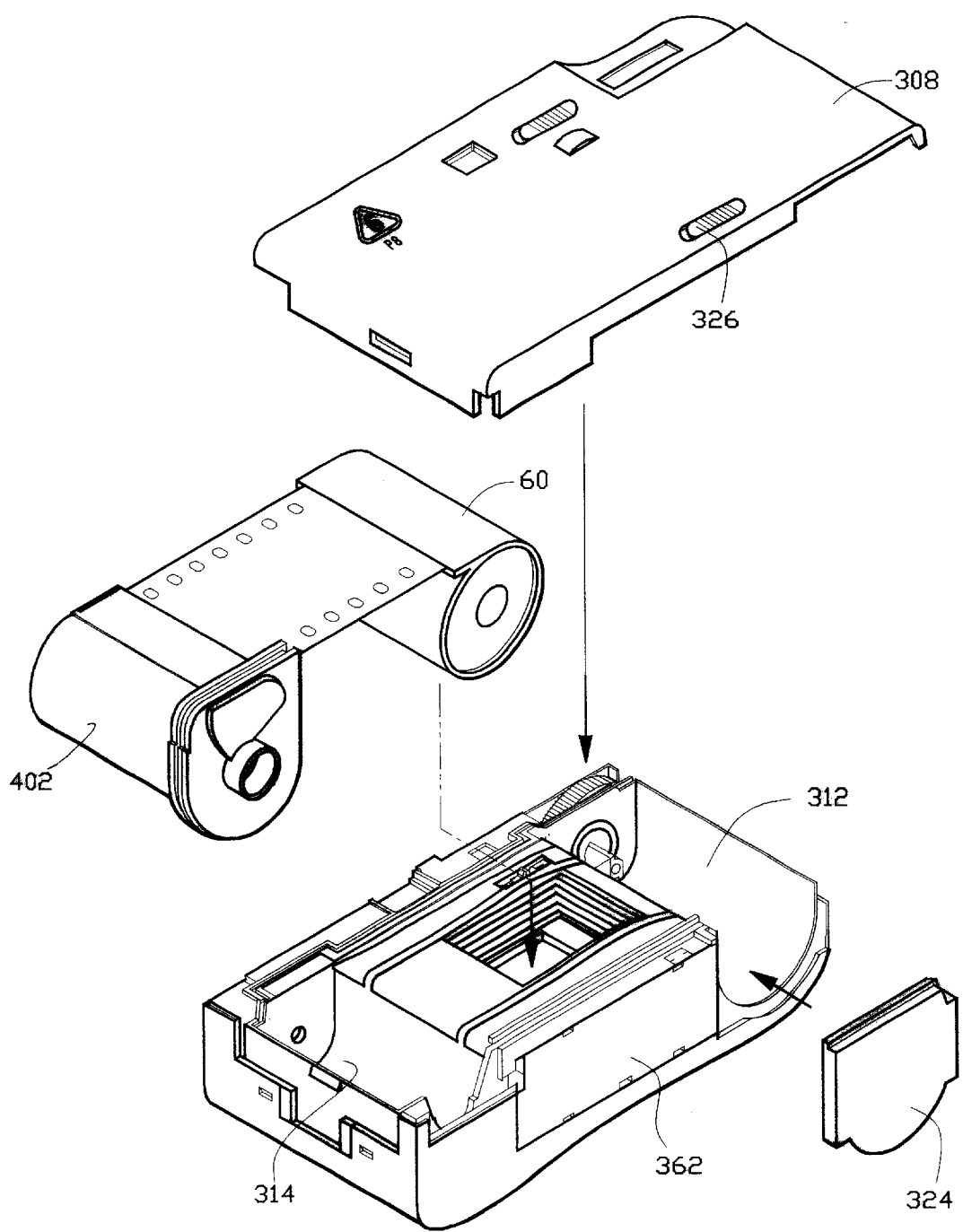
FIG. 26 shows the insertion of the film assembly into the camera.

FIG. 24 shows the back cover 308 being removed. The plate 324 is also removed from the lower end of the chamber 312. The old film container 402' left from the previous use of the camera is also removed and discarded. This step is not necessary if the camera is a new camera being loaded with a film assembly for the first time at the factory. The user then removes the clip (not shown) from the pair of containers 102, 60 and draws these apart so that they are an appropriate distance to be fitted into the respective chambers 312, 314 as indicated in FIG. 26. The plate 324 is then fitted to the lower end of the chamber 312 and the back cover 308 is fitted by push-fitting the edges of the back cover over the protrusions 325 and moving the latches 326 to the left-most position.

The user may also check the flash battery; if the flash still charges quickly then no battery change may be necessary, but if charging is slow then the user may also replace the battery, opening the battery door 362.

The camera is then in a loaded condition for sale to a user in the case of first time loading or in the case of loading by the user is in a re-loaded condition.

The above-described film assemblies and loading method are applicable to use of conventional black and white or colour film, but equally applicable to the use of film which has pre-exposed latent image thereon, such as is described in applicant's U.S. Pat. No. 5,790,906. This film may have a portion or portions such as for example a single edge region of the film or a border region pre-exposed with a latent image such as a decorative image or a message, which thereby appears in the finished photograph. A suitable camera for use in exposing such film has a mask of appropriate shape to mask out the pre-exposed region of film, so that this region does not receive a double exposure.

Figure 27:
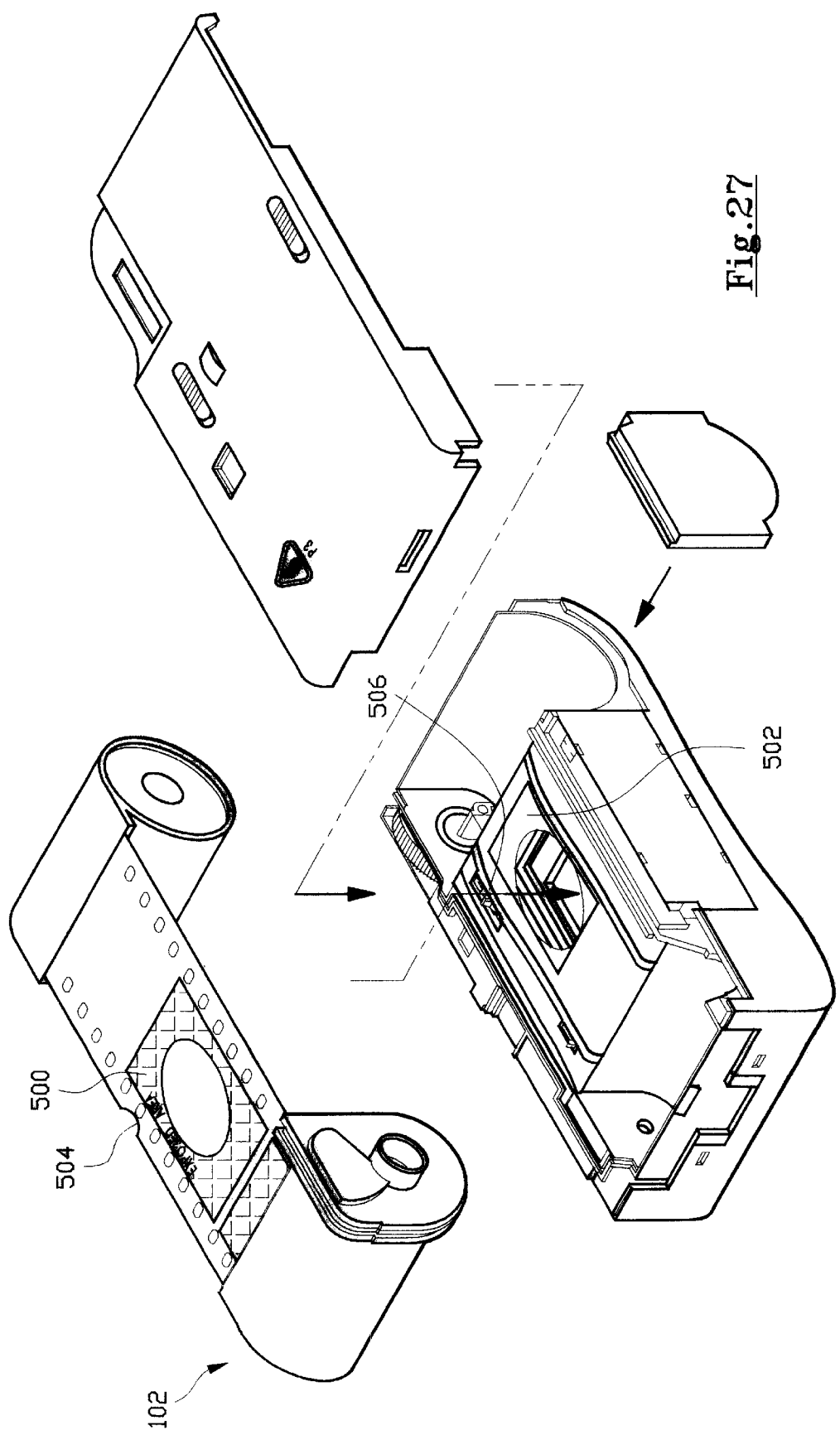
FIG. 27 shows the loading of a film assembly which has film which carries pre-exposed latent images.

FIG. 27 shows a film assembly 2 which is provided with film having a pre-exposed border region, schematically indicated 500. The camera includes suitable masking means 502 so that only the central oval region of film is exposed by the user. With this film it is important that the pre-exposed image is appropriately positioned with respect to the exposure window to ensure correct alignment of the user-exposed image and for this purpose the film has an alignment notch 504 or indicia, whilst the camera has an alignment mark 506 adjacent the upper film guide near the sprocket wheel. On insertion of the assembly 2 into the camera the user or loader must ensure the notch 504 is aligned with the marking 506.

Figure 28:
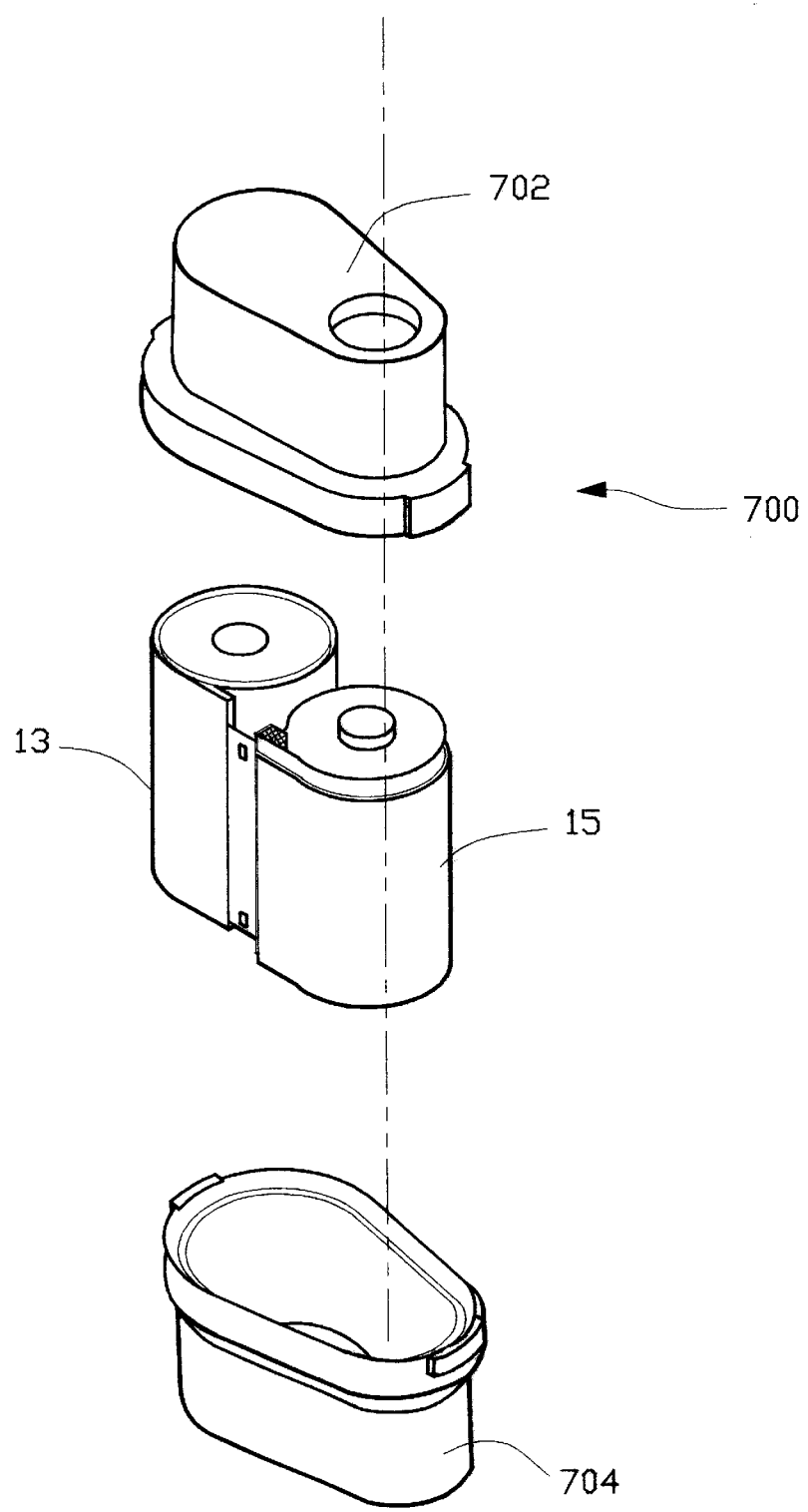
FIG. 28 shows a film assembly canister.
Figure 29:
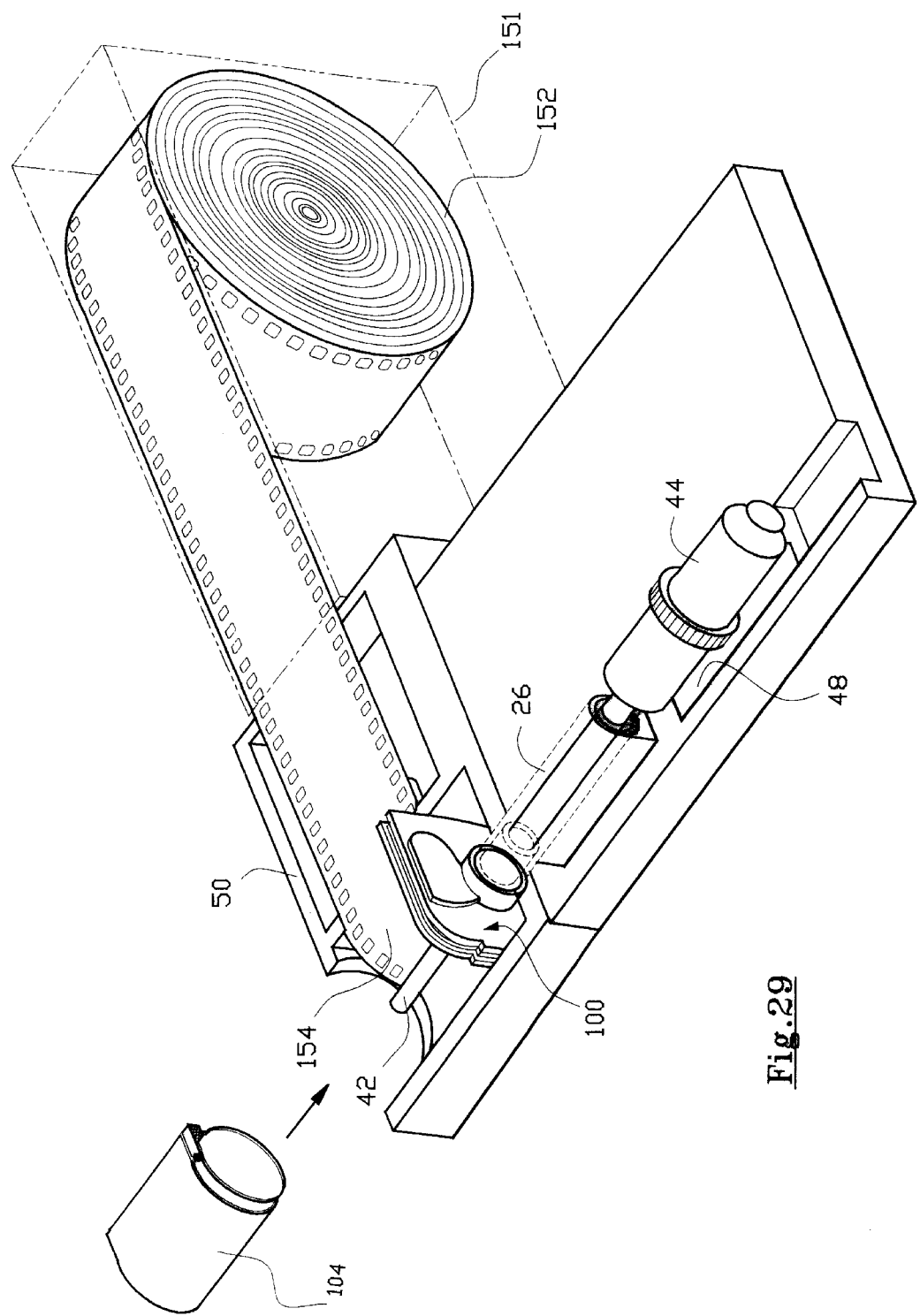
FIG. 29 shows the first step of a method of film loading according to a further aspect of the invention where the film is wound from a bulk roll.

As an alternative to use of a clip and a sealed package, as shown in FIG. 28, an outer housing or canister 700 may be provided. This is adapted to hold the film container and film patrone securely and in a fixed relative orientation. The canister 700 has upper 702 and lower 704 parts which may be snap-fitted or push-fitted together.

The above described embodiments load film into the additional containers from a conventional film patrone. In a further method, the film is unwound from a bulk roll or "pancake" of film 152, as shown in FIGS. 29 to 32.

The bulk roll of film 152 is housed in a light-tight housing 151 shown in dotted lines, exiting through a slot of the housing in a light tight manner. Firstly, the end cover 100 is fitted over the tool end 42 in the manner as described above. The leading end 154 of the bulk roll of film is secured within the split end 42 of the tool, the housing 104 of the film container 102 is inserted so that the leading end 154 of film passes through the slot of the housing 104 until the full width of film is received within the housing 104.

Figure 30:
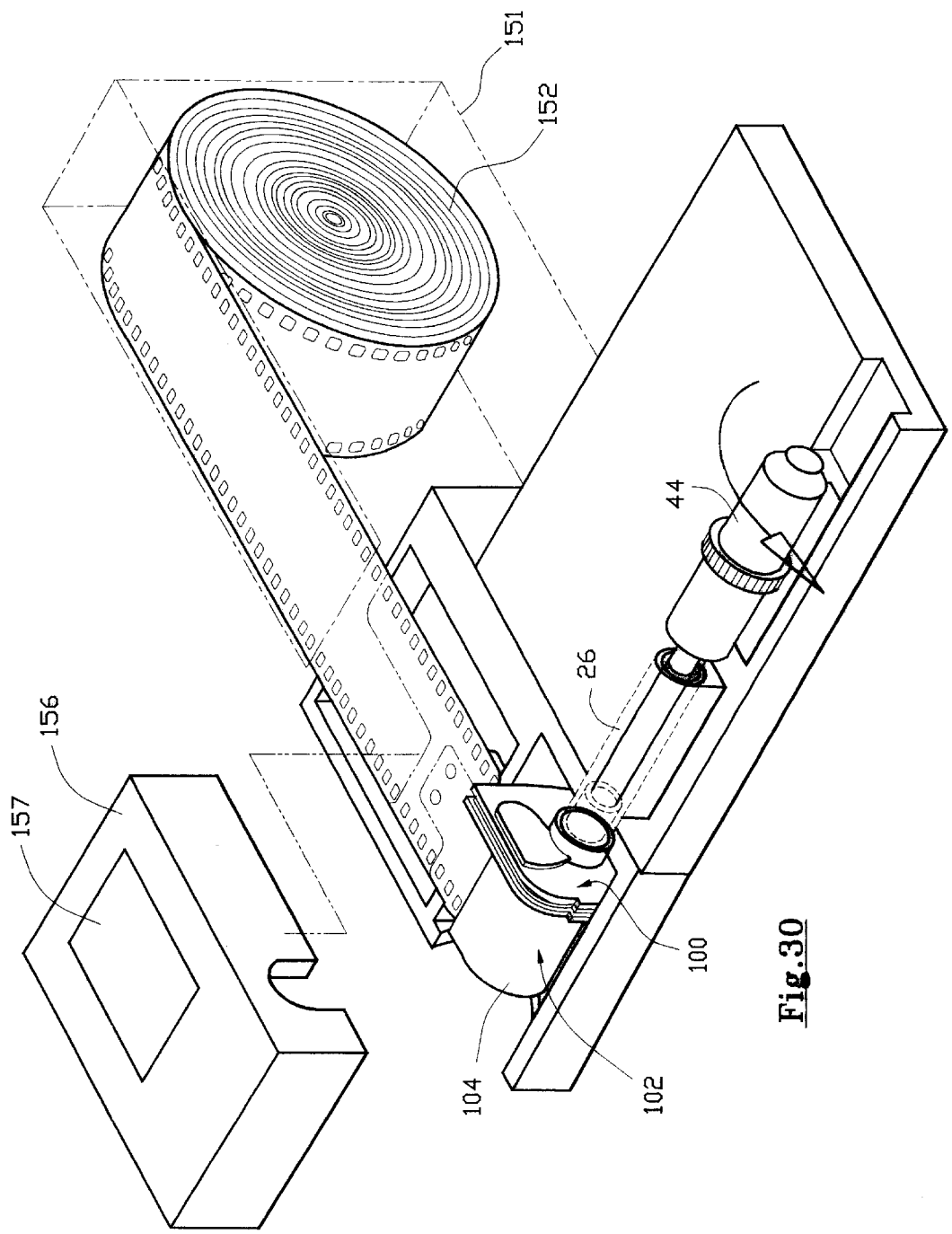
FIG. 30 shows the step of film winding and cutting.
Figure 31:
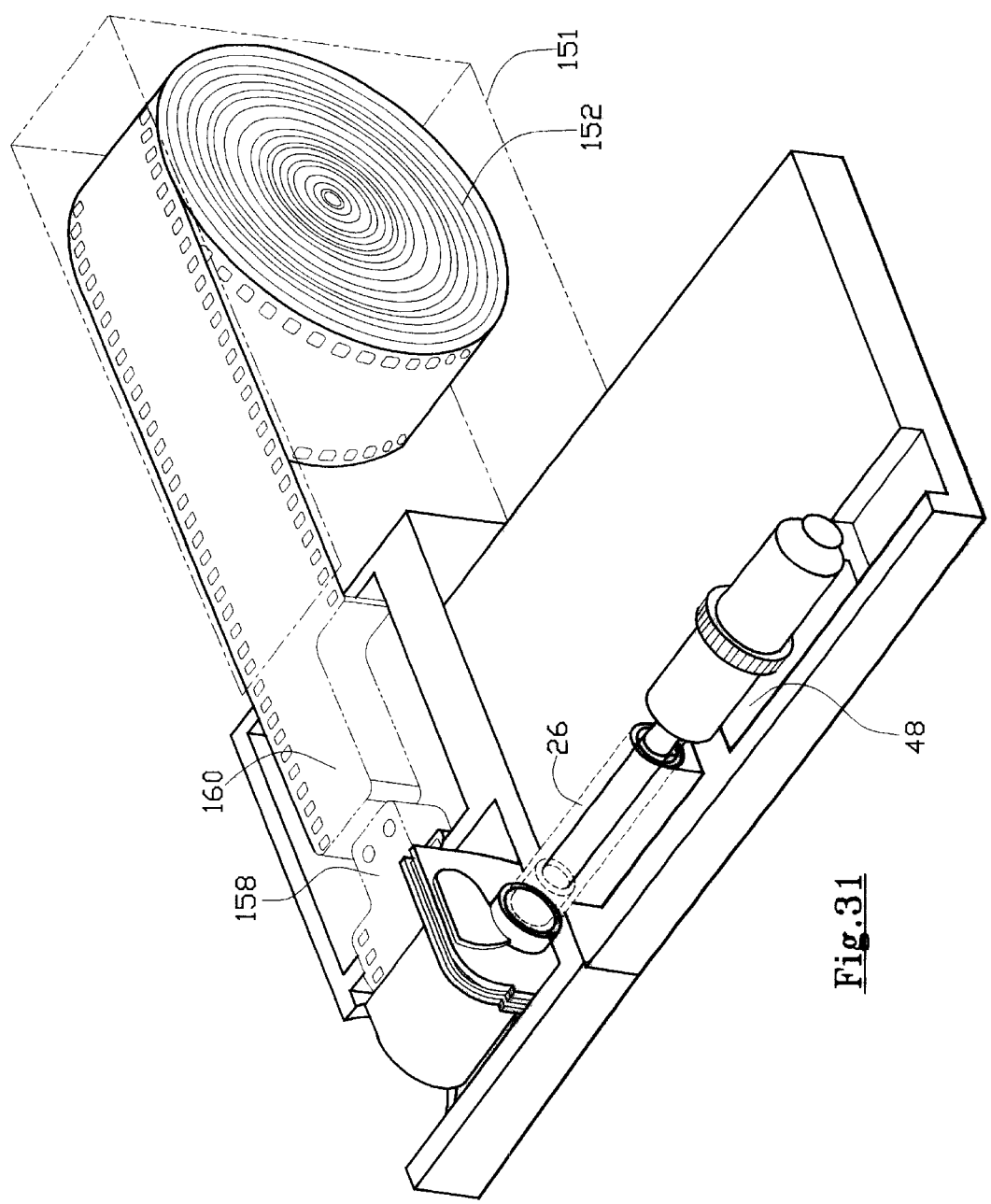
FIG. 31 shows the film after cutting.

As indicated in FIG. 30 the cover 156 is fitted to make a light-tight enclosure with a light-tight passageway for the film from the bulk roll 151 to the container 102. The cover 156 is provided with a central region 157 which is a pneumatically operated punch. The motor 136 is then operated to wind the film into the housing 104. It will usually be arranged that the length of film is sufficient to provide 24 or 36 35 mm exposures contained within the housing 104. The film is then cut by the punch 157 which serves to cut the trailing edge of the film wound into the housing into a short tongue-shaped portion 158, and the new leading end of film roll into a portion of reduced width 160 as indicated in FIG. 31. The winding tool is then retracted by moving the slide 48 away from the sleeve 126.

Figure 32:
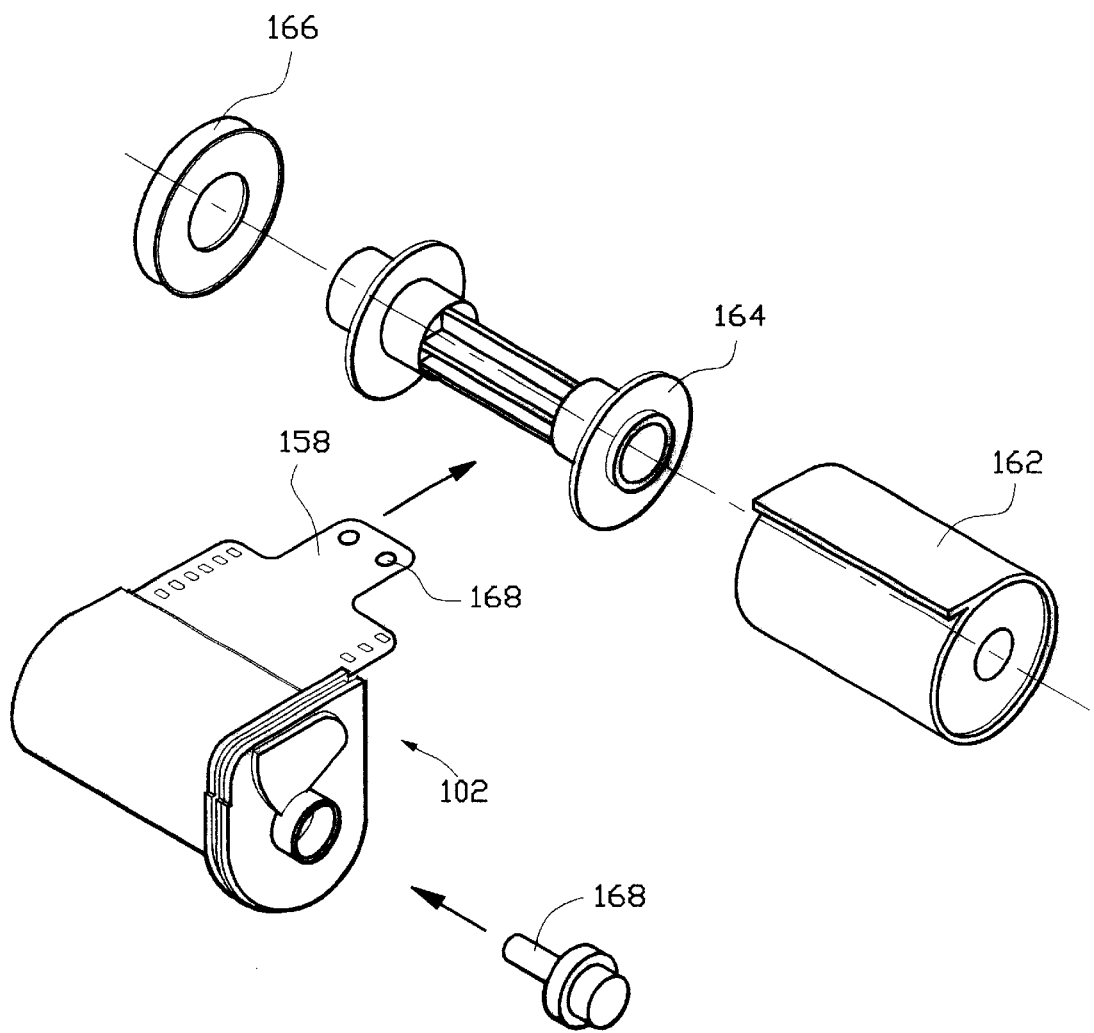
FIG. 32 shows the securing of the film container to a conventional cassette.

As shown in FIG. 32 the film is then attached to a conventional film patrone 104 which comprises an outer housing 162, a spool 164 and a securing ring 166. The spool 164 is provided with an axially extending slot to receive the tongue 158 of the film. Adjacent the slot there are provided a pair of projections which engage the two holes 168 of the tongue 158, as is conventional, to thereby reliably hold the end of the film on the spool 164. Spool 164 with the film attached is then inserted into the container housing 162 so that the film extends through the film slot thereof, and the ring 164 is then fitted to close the patrone. Although not essential, a plug 168 may be fitted in the end of the collar 115 of the plate 108 to render this even more safely light tight.

The assembly of film container 102 and patrone may then be placed at the factory directly into a new camera, for sale to a user. Alternatively, the assembly may be packaged for sale to a user who may themselves re-load their camera with the assembly. The loading of the camera is as discussed above in relation to FIG. 26.

What is claimed is:

1. A photographic film-receiving container having a housing defining an elongate film slot through which, in use, the film may extend, and defining an aperture for insertion of a film-winding tool, with a movable shutter plate movably mounted on the container so as to be movable between an open position in which said aperture is unobscured and a closed position in which the aperture is closed.

2. A photographic film-receiving container according to claim 1 wherein the shutter plate is provided with resilient means to urge the plate into the closed position.

3. A photographic film-receiving container according to claim 1 wherein the shutter plate is pivotably mounted.

4. A photographic film-receiving container according to claim 1 wherein the housing is open at one end which is closed by an end cover defining said aperture therein, the shutter plate being mounted on the end cover.

5. A photographic film-receiving container according to claim 4 wherein the end cover comprises first and second parallel plates having coincident apertures, together defining a cavity therebetween in which the shutter plate is arranged.

6. A photographic film-receiving container according to claim 5 wherein one of the first or second plates has an upstanding peripheral flange which defines a step within which the other of the first or second plate sits.

7. A photographic film-receiving container according to claim 5 wherein the first plate is removably connectable to an end of the housing and is overlain by the second plate.

8. A photographic film-receiving container according to claim 7 wherein the second plate is provided with a collar portion surrounding its aperture.

9. A photographic film-receiving container according to claim 7 wherein the second plate is provided with an arcuate slot-like aperture, and the shutter plate is provided with an upstanding protrusion which protrudes into the slot.

10. A photographic film-receiving container according to claim 1 wherein the housing is open at one end which is closed by an end cover which comprises an end cap closing said opening which is overlain by an end plate secured to the end cap on which said shutter plate is mounted, both said cap and end plate having co-axial apertures therethrough for insertion of the film winding tool.

11. A photograph film-receiving container according to claim 10 wherein the end plate comprises first and second parallel plates having coincident apertures, together defining a cavity therebetween in which the shutter plate is arranged.

12. A photographic film-receiving container according to claim 11 where one of the first or second plates has an upstanding peripheral flange which defines a step within which the other of the first or second plate sits.

13. A photographic film-receiving container according to claim 10 wherein the end cap has a protruding collar portion surrounding its aperture which fits into the aperture of the end plate.

14. A photographic film-receiving container according to claim 13 wherein the end cap and end plate are permanently secured together.

15. A photographic film-receiving container according to claim 1 wherein the housing comprises a pair of housing shell halves which can be fitted together defining a film tool insertion aperture at one end, and defining the film slot between opposed surfaces on the two shell halves.

16. A photographic film-receiving container according to claim 15 wherein the opposed surfaces are each provided with a layer of soft fabric or fabric-like material.

17. A photographic film-receiving container according to claim 15 wherein the said end of the housing is overlain by an end plate which is secured thereto and on which the shutter plate is mounted.

18. A photographic film-receiving container according to claim 17 wherein the end plate comprises first and second parallel plates having coincident apertures, together defining a cavity therebetween in which the shutter plate is arranged.

19. A photographic film-receiving container according to claim 18 wherein one of the first or second plates has an upstanding peripheral flange which defines a step within which the other of the first or second plate sits.

20. A photographic film-receiving container according to claim 17 wherein the housing has a protruding collar portion and wherein the end cap has a protruding collar portion surrounding its aperture which fits into the aperture of the end plate.

21. A photographic film-receiving container according to claim 2 wherein the resilient means is a leg spring, one leg of which engages the shutter plate and the other engages a portion of the end cover.

22. A photographic film-receiving container according to claim 1 in combination with a conventional film patrone and housing a length of photographic film wound in a coil within the film container and extending through the film slot to the film patrone.

23. A film assembly comprising a first film container as claimed in claim 1 and a conventional film patrone, wherein a length of photographic film is coiled within the first film container and extends to the film patrone where it is secured thereto.

24. A photographic camera having a film assembly as claimed in claim 23.

25. A method of loading film into a film assembly comprising a first film container, and a second film container having a housing defining a film slot therein and an end cover which defines a film-winding tool aperture and having thereon a movably mounted shutter plate movable between an open position in which the aperture is unobscured and a closed position in which the aperture is closed, the method comprising the steps of:

(a) providing a first film container having a length of film wound therein;

(b) inserting a film winding tool through the end cover of the second film container with the shutter plate in the open position and securing a leading end of the film extending from the first film container onto the end of the film-winding tool;

(c) inserting one of the housing or film-winding tool having the film secured thereto into or over the other of the film-winding tool or housing and securing the end cover to the housing;

(d) enclosing the first and second film containers in a light-tight enclosure;

(e) rotating the film winding tool to wind the majority of the film out of the first film container and into the second film container;

(f) removing the end of the film winding tool from the second film container and closing the movable shutter plate to close the aperture; and (g) opening the enclosure and removing the film assembly.

26. A method according to claim 25 utilizing a housing formed of two shell halves wherein at step (c) the two shell halves are connected together about the winding tool end.

27. A method according to claim 25 utilizing a second film container where the end cover has a collar portion surrounding the aperture, and utilizing a film winding tool having a support through which the tool extends, wherein during step (e) the collar abuts the support making a light-tight connection therewith.

28. A method according to claim 27 wherein during step (f) the first film container is maintained abutting the support, thereby maintaining a light-tight connection therewith as the end of the film winding tool is withdrawn from the second film container.

29. A method of loading film into a camera having a pair of film chambers arranged on opposite sides of an exposure opening, and a camera back which closes the film chambers comprising the steps of:
(a) providing a first film container having a length of film wound therein;
(b) providing a second film container having a housing defining a film slot therein and an end cover which defines a film winding tool aperture and having thereon a movably mounted shutter plate movable between an open position in which the aperture is unobscured and a closed position in which the aperture is closed;
(c) inserting a film winding tool through the end cover of the second film container with the shutter plate in the open position and securing a leading end of the film extending from the first film container onto the end of the film-winding tool;
(d) inserting one of the housing or film-winding tool having the film secured thereto into or over the other of the film-winding tool or housing and securing the end cover to the housing;
(e) enclosing the first and second film containers in a light-tight enclosure;
(f) rotating the film winding tool to wind the majority of the film out of the first film container and into the second film container;
(g) removing the end of the film winding tool from the second film container and closing the movable shutter plate to close the aperture;
(h) opening the enclosure and removing the film assembly; and
(i) placing the film assembly in the camera with the containers in respective chambers and closing the camera back.

30. A method according to claim 29 wherein the film carries pre-exposed latent images, the method involving at step (i) the additional step of ensuring that an alignment mark on the film is arranged in alignment with an alignment mark on the camera so as to ensure correct alignment of user-exposed images and pre-exposed images.

31. A photographic film-receiving container having a housing comprising a pair of shell halves which together define a film slot through which, in use, film may extend, and defining an aperture for insertion of a film-winding tool, with a shutter plate movably mounted on the container so as to be movable between an open position in which said aperture is unobscured and a closed position in which the aperture is closed.

32. A photographic film-receiving container according to claim 31 wherein each shell half is provided with an edge region which faces the edge region of the other shell half defining the film slot therebetween, each edge region being provided with a strip of soft fabric or fabric-like material thereon.

33. A photographic film-receiving container according to claim 31 having securing means for securing the two shell halves together.

34. A photographic film-receiving container according to claim 33 wherein the securing means provide a snap-fit connection between the two shell halves.

35. A method of loading film into a film assembly comprising a first film container, and a second film container having a housing defining a film slot therein and an end cover which defines a film-winding tool aperture and having thereon a movably mounted shutter plate movable between an open position in which the aperture is unobscured and a closed position in which the aperture is closed, the method comprising the steps of:
(a) providing a length of film wound in a roll and having a leading end;
(b) inserting a film winding tool through the end cover of the second film container with the shutter plate in the open position and securing a leading end of the film extending from the roll onto the end of the film-winding tool;
(c) inserting one of the housing or film-winding tool having the film secured thereto into or over the other of the film-winding tool or housing and securing the end cover to the housing;
(d) enclosing the second film container in a light-tight enclosure in communication with the roll of film;
(e) rotating the film winding tool to wind the film from the roll and into the second film container on the film-winding tool;
(f) cutting the film extending from the second film container to sever it from the roll;
(g) removing the end of the film winding tool from the second film container and closing the movable shutter plate to close the aperture;
(h) opening the enclosure and removing the second film container with the film wound therein; and
(i) securing the free end extending from the second film container to a first film container.

36. A method according to claim 35 wherein the first film container is a conventional film patrone having a central spool, the free end of the film which has been cut from the roll being secured to a spool of the first film container.

37. A method of loading film into a film assembly comprising a first film container, and a second film container having a housing defining a film slot therein and an end cover which defines a film-winding tool aperture having a shutter plate movably mounted thereon movable between an open position in which the aperture is unobscured and a closed position in which the aperture is closed, the method comprising the steps of:
(a) providing a length of film wound in a roll having a leading end;
(b) inserting a film winding tool through the end cover of the second film container with the shutter plate in the open position and securing a leading end of the film extending from the length of film onto the end of a film-winding tool;
(c) inserting one of the housing or film-winding tool having the film secured thereto into or over the other of the film-winding tool or housing and securing the end cover to the housing;
(d) enclosing the second film container in a light-tight enclosure in communication with the roll of film;
(e) rotating the film winding tool to wind the majority of the film out of the first film container and into the second film container;
(f) cutting the film extending from the second film container to sever it from the roll;

(g) removing the end of the film winding tool from the second film container and closing the movable shutter plate to close the aperture;

(h) opening the enclosure and removing the second film container with the film wound therein;

(i) securing the free end extending from the second film container to a first film container to form a film assembly; and (j) placing the film assembly in the camera with the containers in respective chambers and closing the camera back.

38. A method according to claim 25 wherein the shutter plate is provided with a resilient means to urge it into the closed position, wherein at step (b) the shutter plate is held in the open position to allow insertion of the film winding tool, and wherein at step (f) the shutter plate automatically snaps closed.

39. A method according to claim 25 wherein the shutter plate is provided with resilient means to urge it into the closed position, wherein at step (b) the shutter plate is held in the open position to allow insertion of the film winding tool, and wherein at step (g) the shutter plate automatically snaps closed.

40. A photographic film-receiving container according to claim 31 wherein the shutter plate is provided with resilient means to urge the shutter plate into the closed position in which the aperture is obscured.

41. A photographic film-receiving container according to claim 31 wherein the shutter plate is pivotably mounted.

42. A method according to claim 35 wherein the shutter plate is provided with resilient means to urge it into the closed position, wherein at step (b) the shutter plate is held in the open position to allow insertion of the film winding tool, and wherein at step (g) the shutter plate automatically snaps closed.

43. A method according to claim 37 wherein the shutter plate is provided with resilient means to urge it into the closed position, wherein at step (b) the shutter plate is held in the open position to allow insertion of the film winding tool, and wherein at step (g) the shutter plate automatically snaps closed.

* * * * *